(12) United States Patent
Zhao et al.

(10) Patent No.: US 10,708,992 B2
(45) Date of Patent: Jul. 7, 2020

(54) METHODS AND APPARATUS FOR IMAGE ANALYSIS FOR LIGHTING CONTROL

(71) Applicant: Massachusetts Institute of Technology, Cambridge, MA (US)

(72) Inventors: Nan Zhao, Cambridge, MA (US); Joseph Paradiso, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/584,907

(22) Filed: Sep. 26, 2019

(65) Prior Publication Data

US 2020/0029405 A1    Jan. 23, 2020

Related U.S. Application Data

(63) Continuation of application No. 16/139,343, filed on Sep. 24, 2018, now Pat. No. 10,477,641.
(Continued)

(51) Int. Cl.
*H05B 33/08* (2020.01)
*H05B 45/20* (2020.01)
(Continued)

(52) U.S. Cl.
CPC ......... *H05B 45/20* (2020.01); *G06K 9/00691* (2013.01); *G06K 9/00771* (2013.01);
(Continued)

(58) Field of Classification Search
None
See application file for complete search history.

(56) References Cited

U.S. PATENT DOCUMENTS

| 7,167,176 B2 | 1/2007 | Sloan et al. |
| 10,120,267 B2 * | 11/2018 | Bonnier ............... G03B 15/07 |

(Continued)

FOREIGN PATENT DOCUMENTS

WO    2012140152 A1    10/2012

OTHER PUBLICATIONS

Aldrich, M., Experiential lighting: development and validation of perception-based lighting controls; PhD thesis, Massachusetts Institute of Technology, Feb. 2015.
(Continued)

*Primary Examiner* — Seokjin Kim
(74) *Attorney, Agent, or Firm* — Stephen R. Otis

(57) ABSTRACT

Camera images may be analyzed to identify perceptual control axes for a lighting system. These control axes may correspond to how human users perceive lighting scenes. A camera may capture high-dynamic-range images of a new room under various lighting conditions. Dimensionality-reduction may be applied to the images to create an image-based map. In this map, each datapoint may correspond to one of the images. The map may be transformed to align it with how human users perceive lighting scenes in the new room. The transformed map may be employed as a control space for the lighting system. In some cases, the map is created without gathering user ratings of lighting scenes for the new room. In other cases, creating the map involves gathering user ratings for as few as three lighting scenes for the new room.

20 Claims, 12 Drawing Sheets

Related U.S. Application Data

(60) Provisional application No. 62/562,432, filed on Sep. 24, 2017, provisional application No. 62/578,019, filed on Oct. 27, 2017.

(51) Int. Cl.
| | | |
|---|---|---|
| *G06K 9/20* | (2006.01) | |
| *G06K 9/00* | (2006.01) | |
| *G06K 9/62* | (2006.01) | |
| *G06T 7/33* | (2017.01) | |
| *H05B 47/11* | (2020.01) | |
| *H05B 47/105* | (2020.01) | |

(52) U.S. Cl.
CPC ......... *G06K 9/209* (2013.01); *G06K 9/2027* (2013.01); *G06K 9/6247* (2013.01); *G06T 7/33* (2017.01); *H05B 47/105* (2020.01); *H05B 47/11* (2020.01)

(56) References Cited

U.S. PATENT DOCUMENTS

| | | | | |
|---|---|---|---|---|
| 2011/0089842 A1* | 4/2011 | Aldrich | ............... | H05B 47/11 315/152 |
| 2011/0169979 A1 | 7/2011 | Hong | | |
| 2012/0265350 A1 | 10/2012 | Ashdown | | |
| 2014/0139135 A1 | 5/2014 | Saito et al. | | |
| 2015/0035440 A1 | 2/2015 | Spero | | |
| 2015/0257238 A1* | 9/2015 | Paradiso | ............... | H05B 47/19 315/132 |
| 2016/0286630 A1* | 9/2016 | Witzgall | ............. | H05B 47/155 |
| 2018/0253222 A1* | 9/2018 | Zhao | .................... | G06F 3/0481 |

OTHER PUBLICATIONS

Aldrich, M., et al., Energy efficient control of polychromatic solid state lighting using a sensor network; published in Proceedings of SPIE—The International Society for Optical Engineering 7784, Aug. 2010.

Flynn, J., et al., Interim Study of Procedures for Investigating the Effect of Light on Impression and Behavior, published in Journal of the Illuminating Engineering Society, vol. 3, Issue 1, pp. 87-94, Oct. 1973.

Houser, K., et al., Measuring the subjective response to interior lighting: paired comparisons and semantic differential scaling; published in Lighting Research & Technology, vol. 35 issue 3, pp. 183-195, Sep. 1, 2003.

Magielse, R., et al., An Interdisciplinary Approach to Designing Adaptive Lighting Environments; published in 2011 Seventh International Conference on Intelligent Environments, IEEE, 2011.

Magielse, R., et al., A design approach to socially adaptive lighting environments; published in Proceedings of the 9th ACM SIGCHI Italian Chapter International Conference on Computer-Human Interaction: Facing Complexity, pp. 171-176, ACM, New York, NY, USA, Sep. 2011.

Offermans, S., et al., Exploring a hybrid control approach for enhanced user experience of interactive lighting; published in BCS-HCI 2013, Proceedings of the 27th International BCS Human Computer Interaction Conference Article No. 1, Sep. 2013.

Pandey, P., et al., Image Processing Using Principal Component Analysis; published in International Journal of Computer Applications, vol. 15, No. 4, Article 6, Feb. 2011.

Ross, P., et al., The case of sculpting atmospheres: towards design principles for expressive tangible interaction in control of ambient systems; published in Personal and Ubiquitous Computing, vol. 11, Issue 2, pp. 69-79, Jan. 2007.

Vastenberg, M., et al., A user experience-based approach to home atmosphere control; published in Universal Access in the Information Society, vol. 6, Issue 1, pp. 1-13, Jun. 2007.

Wang, H., et al., A study of atmosphere perception of dynamic coloured light; published in Lighting Research & Technology, vol. 46, issue 6, pp. 661-675, Dec. 1, 2014, first published online Oct. 21, 2013.

Zhao, N. et al., A Multidimensional Continuous Contextual Lighting Control System Using Google Glass; published in Proceedings of the 2nd ACM International Conference on Embedded Systems for Energy-Efficient Built Environments, BuildSys '15, pp. 235-244, Nov. 2015.

* cited by examiner

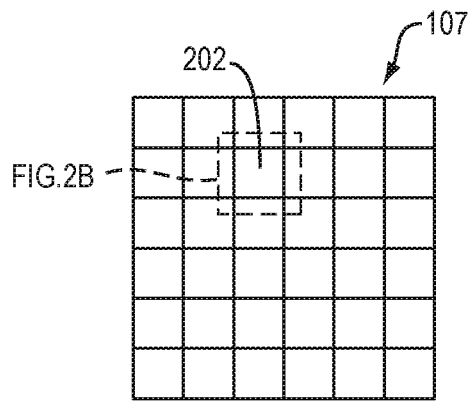
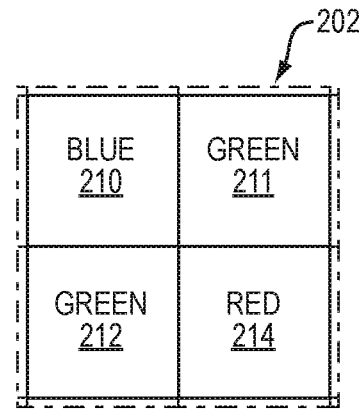
FIG. 2A    FIG. 2B
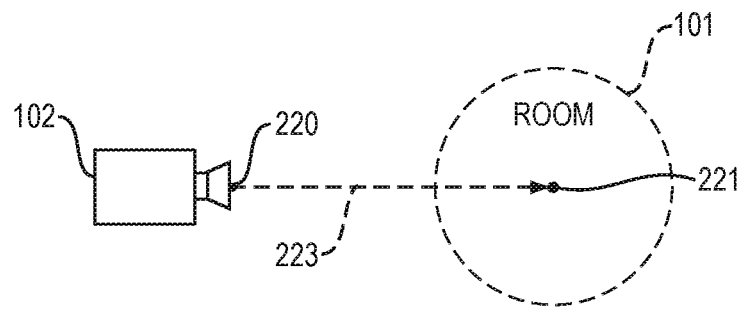
FIG. 2C
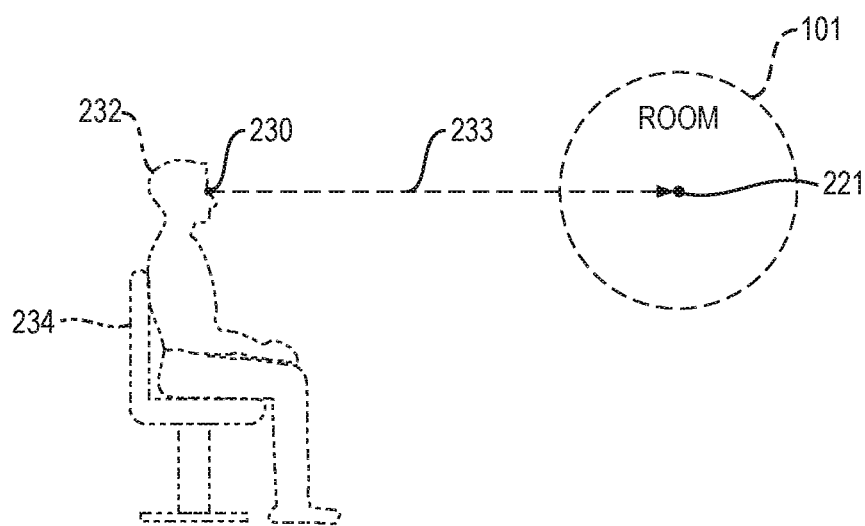
FIG. 2D

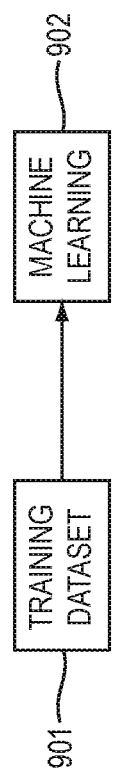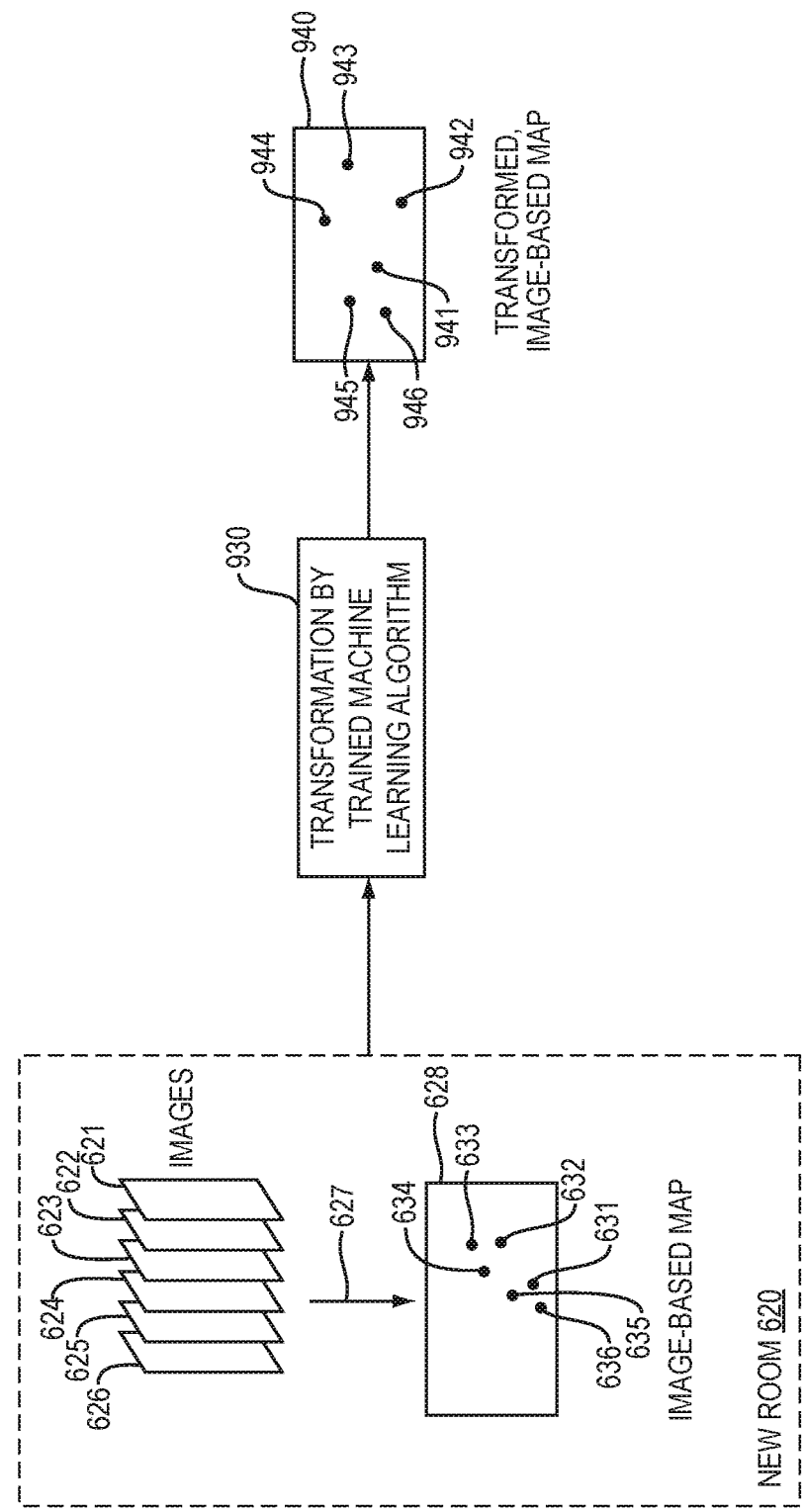

METHODS AND APPARATUS FOR IMAGE ANALYSIS FOR LIGHTING CONTROL

RELATED APPLICATIONS

This application is a continuation of U.S. application Ser. No. 16/139,343 filed on Sep. 24, 2018, which claims the benefit of U.S. Provisional Application No. 62/562,432 filed Sep. 24, 2017 (the "432 application") and the benefit of U.S. Provisional Application No. 62/578,019 filed Oct. 27, 2017 (the "019 application"). As used herein, "Provisionals" means the 432 application and 019 application collectively.

FIELD OF TECHNOLOGY

The present invention relates generally to lighting control.

BACKGROUND

In some conventional lighting systems, the control variables for lighting relate directly to an individual luminaire's output (such as intensity or color temperature of light emitted by the luminaire). In these conventional systems, as the number of luminaires in a room increases, the number of control variables needed becomes too great for practical use. For instance, a conventional lighting system with ten solid-state luminaires, each with three color channels (RGB), may have at least 30 control variables. This large number of control variables may—in these conventional systems— make the control system unacceptably complex for the user.

In some other conventional systems, preprogrammed lighting scenes are employed to improve usability. For instance, in some conventional systems, the user is allowed a choice of only a small number of lighting scenes, where the overall brightness of each luminaire, and the color or color temperature for each luminaire, are pre-computed for each lighting scene. This conventional approach (with a small number of precomputed lighting scenes) reduces complexity of control for the user. However, it restricts the user to only a small fraction of lighting configurations, out of the vastly larger number of lighting configurations which could be realized with a given set of luminaires in the room.

In some recent lighting control systems, a user controls lighting in a room by employing what we loosely call "perceptual control dimensions." In these recent systems, each perceptual control dimension corresponds to how humans would perceive lighting in a room as being conducive to a particular mental state or to a particular type of human activity. For instance, in a recent system, three perceptual control dimensions are "Casual", "Presentation" and "Visually Demanding", where: (a) different positions along the "Casual" axis indicate the extent to which a human would perceive lighting in the room as being conducive to casual social interaction or relaxing; (b) different positions along the "Presentation" control axis indicate the extent to which a human would perceive lighting in a room as being conducive to making a visual presentation (such as with PowerPoint® slides); and (c) different positions along the "Visually Demanding" control axis indicate the extent to which a human would perceive lighting in a room as being conducive to a visual demanding task such as studying. In this example, a user may—by selecting coordinates along the Casual, Presentation and Visually Demanding axes— adjust the overall brightness and RGB intensities of each luminaire in a room. Thus, in this example, there are only three control dimensions, yet these three dimensions afford the user the ability to select any of a very large number of lighting combinations. Furthermore, in this example, these three perceptual dimensions correspond to how a user perceives lighting in the room, rather than corresponding to physical output settings of individual luminaires or to only a few pre-computed lighting configurations.

In these recent systems, perceptual control dimensions may be determined from user ratings. For instance, human users may view a room under different lighting scenes and then fill out a survey regarding their perception of the different lighting scenes. A dimensionality reduction algorithm may be employed to produce a low-dimensional representation of these user ratings. For instance: (a) PCA (principal component analysis) may be employed to reduce this user data to principal components where each component has the highest variance possible under the constraint that it is orthogonal to the preceding component; and (b) the first two or three principal components may be selected as the perceptual control dimensions. For instance, the first three principal components may be the "Casual", "Presentation" and "Visually Demanding" control dimensions described above.

A problem with these recent systems (which employ perceptual control dimensions) is that it may be too expensive and time-consuming to gather user ratings for a large number of lighting scenes each time that the lighting control system is deployed in a new room. A related problem with these recent systems is that it is difficult to generalize from one room to the next, without repeating the entire user rating process for the new room.

SUMMARY

In illustrative implementations of this invention, the problems described above are solved by automating entirely, or to a large extent, the process of (a) determining perceptual control axes for lighting for a room; and (b) determining the coordinates (along the perceptual control dimensions) of any given lighting combination. As a result, in illustrative implementations, perceptual control axes for a new room may be determined automatically and accurately, with little or no new user ratings. Likewise, in illustrative implementations, the coordinates (along the perceptual control dimensions) of any given lighting combination for a new room may be determined automatically and accurately, with little or no new user ratings.

In illustrative implementations, this automation is achieved by analyzing images of a room which are captured by a camera under different lighting scenes.

Based on the camera images, a computer may accurately estimate how humans would perceive different lighting scenes for a room. In some cases, a computer may do this even for a new room.

In some use scenarios of this invention, the perceptual control dimensions are "Focus" and "Casual", where (a) position along the Focus axis indicates the extent to which humans would perceive room lighting as being conducive to tasks that require mental focus; and (b) position along the Casual axis indicates the extent to which humans would perceive room lighting as being conducive to relaxing or to casual social interaction.

The images that are analyzed may comprise HDR (high dynamic range) images. Thus, in some cases, a camera captures HDR images of a room, where each HDR image is captured under a different lighting scene. In some cases: (a) the camera has a limited dynamic range that is smaller than the dynamic range of the HDR image; and (b) each HDR image is created from multiple images captured at different stops of the camera. For instance, if each HDR image is created from nine images at different exposure values and if six different lighting scenes are employed, then: (a) a total of 54 images may be captured (nine images per lighting scene); (b) six HDR images may be created from the 54 images; and (c) there may be one HDR image per lighting scene. Alternatively, in some cases, the camera itself has a high dynamic range and captures the HDR image in a single exposure. In yet other cases, the HDR image is a rendering that is created by computer software. For instance, the HDR image may be a rendering that simulates a room illuminated by a lighting scene.

In some cases, the HDR images each have a dynamic range of at least 32,000:1, or of at least 16,000:1, or of at least 8,000:1.

A lighting scene—also called a lighting condition—may comprise an illumination pattern which is created by a specific set of luminaires arranged in a specific spatial configuration in a room with a specific combination of intensity and color settings for the individual luminaires. Similarly, a lighting scene—also called a lighting condition—may comprise a rendered illumination pattern which appears as if it were created by a specific set of luminaires arranged in a specific spatial configuration in a room with a specific combination of intensity and color settings for the individual luminaires.

A computer may perform dimensionality reduction on the images to create a low-dimensional representation of the images. We sometimes call this low-dimensional representation of the images an "image-based map".

In some cases, the image-based map has two dimensions. Each datapoint in the image-based map may correspond to an image. If there is one image per lighting scene, then each datapoint in the image-based map may also correspond to a lighting scene. Distance between two datapoints in the image-based map may be indicative of the similarity or dissimilarity of the two lighting scenes that correspond to the two datapoints.

In some cases, a computer transforms the image-based map in such a way that the transformed, image-based map is aligned with how humans perceive lighting scenes.

The transformation may comprise registering the image-based map with a rating-based map. The "rating-based map" may comprise a low-dimensional representation of user ratings of lighting scenes.

The registration may rotate, scale, translate or otherwise transform the image-based map in such a way that, after the registration, the image-based map is aligned with the rating-based map. In some cases, the transformation that is applied to the image-based map comprises an affine transform. In some cases, the transformation involves Procrustes analysis. More generally, any algorithm for aligning or registering two datasets may be employed.

At least four different approaches may be employed to transform the image-based map.

First Approach—User Ratings from Reference Room(s): In the first approach, the registration comprises aligning an image-based map for a new room with a rating-based map for a different room or rooms (which we sometimes call reference rooms). Registering an image-based map for a new room with a rating-based map for a reference room may facilitate the automated deployment of the lighting control system to the new room. This is because, once user ratings have been obtained for a reference room, the system may be deployed to a new room without gathering more user ratings.

Second Approach—User Ratings from New Room: In the second approach, the registration comprises aligning an image-based map for a new room with a rating-based map for the new room, where the rating-based map is created with user ratings for as few as three lighting scenes. This second approach, too, may facilitate the efficient deployment of the lighting control system to the new room. This is because, once user ratings have been obtained for a reference room, the system may—in the second approach—be deployed to a new room while gathering user ratings for only three lighting scenes. In the second approach, the rest of the analysis may be performed automatically (e.g., by analyzing HDR images).

The second approach has many advantages. It does not require that user ratings of lighting scenes be obtained for any other room. Furthermore, it may be performed accurately for any new room, regardless of the size of the new room (relative to any previously measured rooms) and regardless of whether the new room is diffusely illuminated. It may employ user ratings of fewer lighting scenes than would be needed if only user ratings (and not camera images) were employed.

In the first and second approaches, the rating-based map is a low-dimensional representation of user ratings of lighting scenes. The rating-based map may be created by: (a) gathering user ratings for lighting scenes; and (b) performing dimensionality reduction on the user ratings. Each datapoint in the rating-based map may correspond to a lighting scene.

In the first and second approaches, the transformed, image-based map may align with how human users perceive lighting scenes for the new room. This alignment may be particularly close where one or more of the following conditions apply: (a) the new room is the same size as, or smaller than, the reference room (s); and (b) the new room and the reference room(s) have relatively little contrast in illumination levels (e.g., because of light reflecting off of diffusely reflective walls to create a diffuse illumination with relatively little contrast).

Third Approach—Machine Learning. In the third approach, the image-based map is transformed by a trained, machine learning algorithm, in such a way that the transformed representation is aligned with how humans perceive lighting scenes. For instance, the machine learning algorithm may be trained on a large set of labeled lighting scenes, where the labels indicate user ratings for these lighting scenes. For example, in some cases, the training set comprises images of multiple lighting scenes for each room in a large set of rooms, where: (a) each room is different than each other room (e.g., in size of room, furniture, external windows or lack of windows, or type and color of paint on walls); and (b) each image is an image of a particular room under a particular lighting scene and is labeled by a label that comprises, or is derived from, one or more user ratings for that particular room under that particular lighting scene.

An advantage of this third approach is that—if the training set is sufficiently large and diverse—the machine learning algorithm may flexibly handle a wide variety of different types of new rooms.

Fourth Approach—No User Ratings: In the fourth approach, the image-based map is transformed without reference to any user ratings. For instance, the image-based map may be transformed in such a way as to maximize distance between datapoints in the image-based map (where each datapoint corresponds to a lighting scene).

In this fourth approach (where the transformation is without reference to any user ratings), the transformed, image-based map typically does not correspond to human perceptions of lighting scenes.

In some cases, the fourth approach is well-suited for use scenarios where a user does not explicitly enter coordinates along a lighting control axis. For example, in some use scenarios: (a) a user inputs an instruction to output lighting that tends to maintain the current physiological state of the user; (b) a lighting control algorithm employs control axes; and (c) these axes correspond to the axes of a transformed, image-based map, which transformed map results from a transformation without reference to user ratings. In the preceding example, the fact that the control axes do not correspond to human perception is not important, because the control axes are employed in the back end without the user being aware of them.

In illustrative implementations, the dimensions (axes) of a transformed, image-based map may be employed as the dimensions (axes) for lighting control for a room. These control axes may be the same as, or may closely approximate, the dimensions of a low-dimensional representation of how humans would perceive lighting in the room. Thus, in some cases, these control axes are perceptual control dimensions.

In illustrative implementations: (a) the transformed, image-based map is employed as a control space for lighting; and thus (b) the coordinates of a lighting scene (in the transformed map) are employed as the coordinates of that lighting scene in the control space. For instance, if a particular lighting scene has coordinates of (0.75, 2.54) in the transformed, image-based map, then that particular lighting scene may have coordinates (0.75, 2.54) in a perceptual lighting control system for that room.

In some implementations, PCA (principal component analysis) is employed for dimensionality reduction. For instance, in some cases: (a) a camera captures images of a room, each image under a different lighting scene; (b) PCA is performed to create a low-dimensional representation of the images (an image-based map); (c) an affine transform is applied to this image-based map; and (d) the transformed, image-based map (which results from the transform) closely approximates a low dimensional representation of user ratings of lighting scenes.

In the PCA example described in the preceding paragraph: (a) the PCA computes principal components; and (b) one or more dimensions (axes) of the image-based map (before the affine transform is applied) correspond to one or more of these principal components. For instance, in some cases: (a) if the image-based map is two-dimensional, then its two axes may be the first and second principal components; and (b) if the image-based map is three-dimensional, then its three axes may be the first, second and third principal components.

In the PCA example described in the preceding two paragraphs, the one or more dimensions (axes) of the transformed, image-based map may comprise one or more transformed principal components. These transformed principal components may be employed as the control dimensions (axes) for lighting control of the room.

In illustrative implementations of this invention, any dimensionality reduction method may be employed to create a low-dimensionality representation of the images.

In illustrative implementations, a user may input coordinates along perceptual control dimensions. In response to this user input, a lighting control system may adjust the settings (e.g., intensity and color) of each luminaire in the room to create the lighting scene that is closest (in the perceptual control dimensions) to the coordinates that the user inputted. In this use scenario, a computer may determine, based on the camera images, which lighting scene is closest (in the perceptual control dimensions) to the inputted coordinates.

Alternatively, in some cases, a user may input instructions to output lighting that tends to cause the user to remain in the user's current physiological state (i.e., the user's physiological state at the time the user inputs the instructions). Sensors may take physiological readings of the user (e.g., heart rate, respiration rate, head orientation, and posture). Based on the sensor readings, a lighting control system may determine the user's physiological state at the time the instructions are inputted, and may adjust the settings (e.g., intensity and color) of each luminaire in the room to create the lighting scene that tends to cause the user to remain in that state. In this use scenario, a computer may determine, based in part on the camera images, which lighting scene is closest to the coordinates (in the perceptual control dimensions) that correspond to the physiological state that the user seeks to maintain.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 2A shows a multi-pixel image sensor in a color digital camera.

FIG. 2B shows a pixel of the image sensor in FIG. 2A, which pixel includes red, green and blue color channels.

FIGS. 2C and 2D, taken together, show that a camera may have the same vantage point relative to a room (while capturing images of the room under various lighting scenes) as does a user (when observing the same room under various lighting scenes at another time).

FIGS. 6, 7, 8, 9B, and 10 each show a method of creating an image-based map and then transforming it. In FIGS. 6, 7, 8, and 9B, the transformation causes the image-based map to become aligned with how humans perceive a scene.

In FIG. 6, an image-based map for a new room is registered with a rating-based map for a different room (reference room).

In FIG. 7, an image-based map for a new room is registered with a rating-based map for multiple other rooms (reference rooms).

In FIG. 8, an image-based map for a new room is registered with a rating-based map for the new room, where the rating-based map is derived from user ratings for as few as three lighting scenes for the new room.

FIG. 9A shows a machine learning algorithm being trained on a dataset of images and user perception data.

In FIG. 9B, a trained learning machine algorithm transforms an image-based map for a new room in such a way that the resulting map is aligned with how users would perceive lighting scenes in the new room.

In FIG. 10, an image-based map for a new room is transformed without reference to any user ratings or other data regarding human perception of lighting scenes.

The above Figures are not necessarily drawn to scale. The above Figures show some illustrative implementations of this invention, or provide information that relates to those implementations. The examples shown in the above Figures do not limit this invention. This invention may be implemented in many other ways.

DETAILED DESCRIPTION

General

In illustrative implementations of this invention, an image-based mapping method rapidly evaluates the perceptual impression of lighting scenes using photographs or renderings.

In illustrative implementations, lighting control is performed with a small set of control dimensions that correspond to how users perceive a lighting scene (e.g., the control dimensions of "Focus" and "Restoration"). These perceptual control axes may allow a user to control a lighting in a manner that matches how the user intuitively classifies the lighting—e.g., does the lighting help me focus? does the lighting help me relax?

In a conventional lighting system: (a) four RGB-luminaires would need twelve device-centered control dimensions; and (b) these twelve dimensions would access the complete solution space.

In contrast, in the present invention, the perceptual control approach allows the solution space to be compressed to two or three user-centered control dimensions that establish a new control map. In the present invention, the control map may give the user access to a continuous subset of the most interesting and relevant lighting configurations. This subset may be identified by using a very small number of landmark lighting scenes. In some cases, the landmark lighting scenes are designed by a human lighting expert or by a user, or are computer generated based on domain knowledge.

In illustrative implementations, images are employed to evaluate lighting scenes in order to establish a latent model that describes perceptual meaning of these scenes. The image-based model may establish a representation of the relative relationships of lighting scenes. This image-based map may facilitate rapid computational analysis of lighting scenes.

An advantage of the present invention is that it, in some cases, it may be deployed to control lighting in a new room, without gathering user ratings of lighting scenes in that new room. Or, in some other cases, user ratings of only three lighting scenes in the new room are gathered, in order to deploy the control system in the new room.

Hardware

Figure 1:
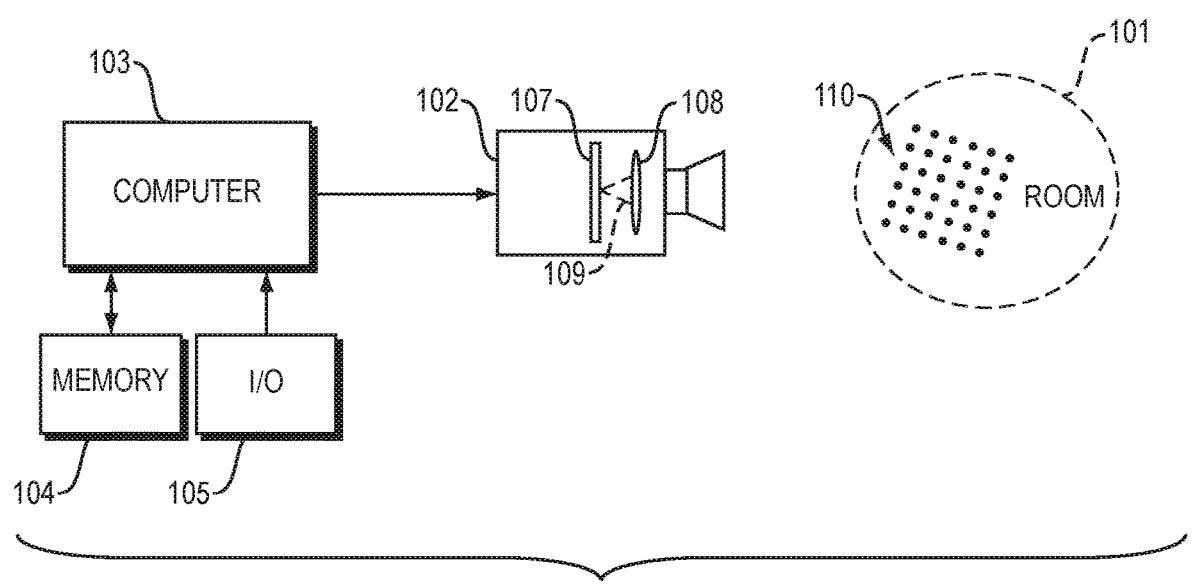
FIG. 1 shows hardware for capturing images of lighting scenes in a room.

FIG. 1 shows hardware for capturing images. In the example shown in FIG. 1, a digital color camera 102 captures images of a room 101 under different lighting scenes. A computer 103 controls the camera and analyzes images captured by the camera. The computer may store data in, and access data from, memory device 104.

In FIG. 1, camera 102 may include a lens 108 that focuses light from the room onto an image sensor 107. Thus, camera 102 may capture focused, color images of room 101. Each pixel of image sensor 107 may include an array of color filters.

Thus, camera 102 may capture color information separately for each region in a set of discrete regions 110 of room 101, where each region corresponds to a pixel of image sensor 107. This ability (to measure color information separately for different regions of the room) may help the camera gather data relevant to a user's perception of a lighting scene. The user's perception may be determined, at least in part, by a pattern of colors or color temperatures in different regions in a room (as opposed to merely the overall color or color temperature for the room).

The room 101 that is illuminated by the lighting system may comprise any type of room, such as a windowless office, an office with one or more windows, a conference room, a waiting room, a room in a doctor's office or dentist's office, a laboratory room, a kitchen, a dining room, a living room, a library room, a bedroom, a dressing room, a walk-in closet, a bathroom, a basement room, a den, a home theater room, or a sauna room.

In some cases, optical sensors are distributed in multiple positions in a room (instead of or in addition) to a camera, and record data regarding light incident on the optical sensors while the room is illuminated with various lighting scenes. In some cases, each image that is captured under a lighting scene comprises data that is recorded by these optical sensors. In some cases, each image (in a subset of the images that are captured under a lighting scene) comprises data that is recorded by these optical sensors. In some cases, each image that is shown or described in FIGS. 4 to 11B comprises data that is recorded by these optical sensors regarding light incident on the optical sensors while the room is illuminated with a lighting scene. In some cases, each image (in a subset of the images shown or described in FIGS. 4 to 11B) comprises data that is recorded by these optical sensors regarding light incident on the optical sensors while the room is illuminated with a lighting scene. In some cases, each instance in which FIGS. 4 to 11B show or describe a camera capturing an image may be replaced by optical sensors measuring data regarding light incident on the optical sensors while the room is illuminated with a lighting scene. In some cases, each instance (in a subset of the instances in which FIGS. 4 to 11B show or describe a camera capturing an image) may be replaced by optical sensors measuring data regarding light incident on the optical sensors while the room is illuminated with a lighting scene. In some cases, for each lighting scene: (a) one or more cameras each capture an image of the room illuminated by the lighting scene, or (b) one or more optical sensors record data regarding light incident on the optical sensors while the room is illuminated with the lighting scene, or (c) both the one or more cameras and the optical sensors capture images and record data as described in clauses (a) and (b) of this sentence.

Camera 102 may comprise one or more cameras. In FIG. 1, camera 102 may be replaced by one or more cameras, or by one or more light sensors, or by both one or more cameras and one or more light sensors.

As noted above, camera 102 captures images of a room 101 under different lighting scenes. These lighting scenes may comprise illumination patterns produced by luminaires in room 101. For instance, in some cases: (a) computers 303 and 103 are the same computer; and (b) luminaires 361, 362, 363, 364, 365, 366 are in room 101 and produce the lighting scenes. Or, in some cases: (a) rooms 350 and 101 are the same room; and (b) luminaires 371, 372, 373, 374, 375, 376 are in room 101 and produce the lighting scenes.

FIG. 2A shows a close-up of multi-pixel image sensor 107. For ease of illustration, image sensor 107 is shown as comprising only 36 pixels (e.g., pixel 202) in a 6×6 array. Typically, however, the actual number of physical pixels in the camera is much larger.

FIG. 2B shows a close-up of pixel 202. Pixel 202 includes red, green and blue color channels. For instance, pixel 202 may include a set of Bayer color filters comprising a blue filter 210, two green filters 211, 212, and a red filter 214.

In some implementations, it is advantageous for camera 102 (which captures images of room under different lighting scenes) to observe room 101 from the same vantage point as that from which a user observed room 101 while rating lighting scenes in the room. Causing the user and camera to observe a room from the same vantage point (but at different times) may make the control system more accurate. For instance, if the user and camera observe the room from the same vantage point, then the control system may be able to more accurately estimate (based on an image-based map) how users perceive lighting scenes in the room.

FIGS. 2C and 2D, taken together, show that a camera may have the same vantage point relative to a room (while capturing images of the room under various lighting scenes) as does a user (when observing the same room under various lighting scenes at another time). In FIG. 2B, vector 223 originates at point 220 at the center of the aperture of camera 102. In FIG. 2C, vector 233 originates at point 230 on the bridge of the nose of user 232. Points 220 and 230 are co-located at the same position. Both vectors 223 and 233 end at point 221 in room 101. Vectors 223 and 233 have the same length and have the same direction, relative to point 221 in room 101. Thus, camera 102 and user 232 observe room 101 from the same vantage point (220 and 230, which are co-located) and from the same angle, but at different times.

In some cases, the images that are used to create the image-based map are not actually captured by a camera, but are instead renderings that are created by a computer and that show a simulation of a room illuminated by a lighting scene. In some cases, each image that is shown or described in FIGS. 4 to 11B comprises an image rendered by computer simulation. In some cases, each instance in which FIGS. 4 to 11B show or describe a camera capturing an image may be replaced by a computer creating a rendered image. In some cases, each rendered image simulates an image that would be captured by a camera which: (a) has the same vantage point, relative to the room, as the vantage point from which a user observed the room while making user ratings used in the rating-based map; and (b) captures the image from the same angle, relative to the room, as that from which a user observed the room while making user ratings used in the rating-based map.

In some cases, each image that is shown or described in FIGS. 4 to 11B comprises an HDR image. For instance, in some cases, each image that is shown or described in FIGS. 4 to 11B comprises an HDR image and has a dynamic range that is greater than or equal to 32,000:1, or is greater than or equal to 16,000:1, or is greater than or equal to 8,000:1.

Figure 3A:
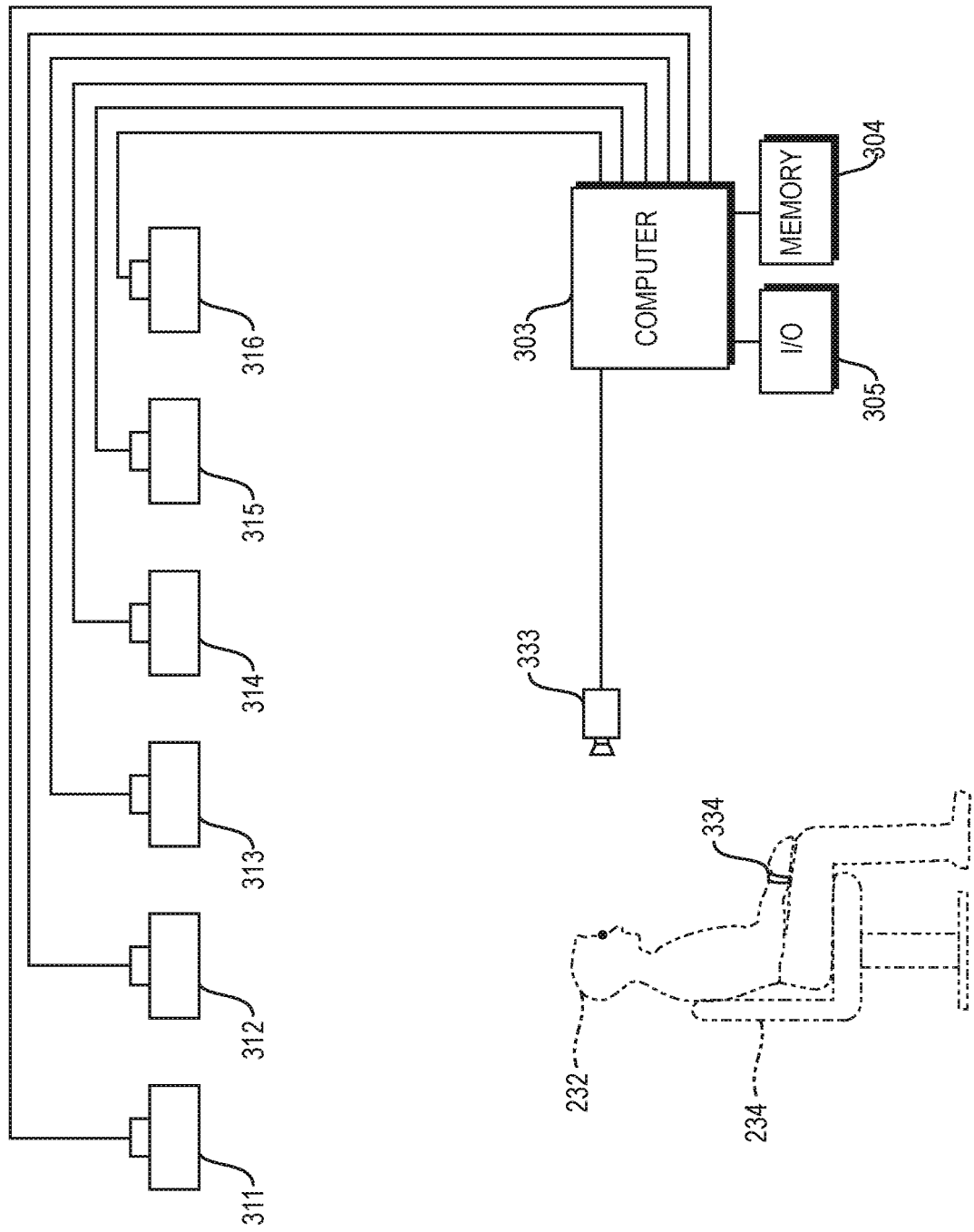
FIG. 3A shows hardware for controlling luminaires.

FIG. 3A shows hardware for controlling luminaires. In the example shown in FIG. 3, a set of luminaires 311, 312, 313, 314, 315, 316 illuminate a room. In FIG. 3, computer 303 controls these luminaires. For instance, in some cases: (a) each luminaire is itself an array of LEDs with color filters; and (b) the intensity and color temperature of light emitted by each luminaire is dynamically controlled by computer 303. The computer may store data in, and access data from, memory device 304.

In FIG. 3A, in some use scenarios, a user 232 inputs coordinates (along perceptual control axes) of a target lighting scene. For instance, in some use scenarios, the user may input the coordinates (2.0, −1.8), where 2.0 and −1.8: (a) are the coordinates for Focus and Restore control axes, respectively; and (b) indicate that the user wants the lighting to be conducive to mental focus, but not to casual, relaxing social interaction.

In FIG. 3A, input may be provided via one or more I/O devices 305. In response to this input, computer 303 may access a look-up table to determine, for each luminaire, intensity and color settings that correspond to the target lighting scene. Computer 303 may then output instructions to the luminaires, in such a way that the luminaires, taken together, output the target lighting scene.

In FIG. 3A, sensors take physiological measurements of user 232 while lighting scenes are produced by the luminaires. For instance, a wristband 334 may house a sensor that tracks cardiac pulse rate of user 232. A webcam 333 may detect the user's head position (e.g., looking down at a book or computer screen or looking up while talking to another person). Also, webcam 333 may detect the user's posture, such as sitting down in chair 234 or standing up.

In some use scenarios, a user instructs the lighting system to output illumination that will tend to cause the user to remain in the same physiological state as that of user when the instruction is provided. In these scenarios, the sensor measurements may be analyzed to determine the physiological state of user when the instruction is provided.

In FIGS. 1A and 3A, a user may input instructions or data to, and receive output from, a computer (e.g., 103, 303) via one or more input/output devices (e.g., 105, 305) The I/O devices may comprise one or more of: a touch screen, other electronic display screen, keyboard, mouse, microphone, handheld electronic game controller, digital stylus, speaker, or projector for projecting a visual display.

Figure 3B:
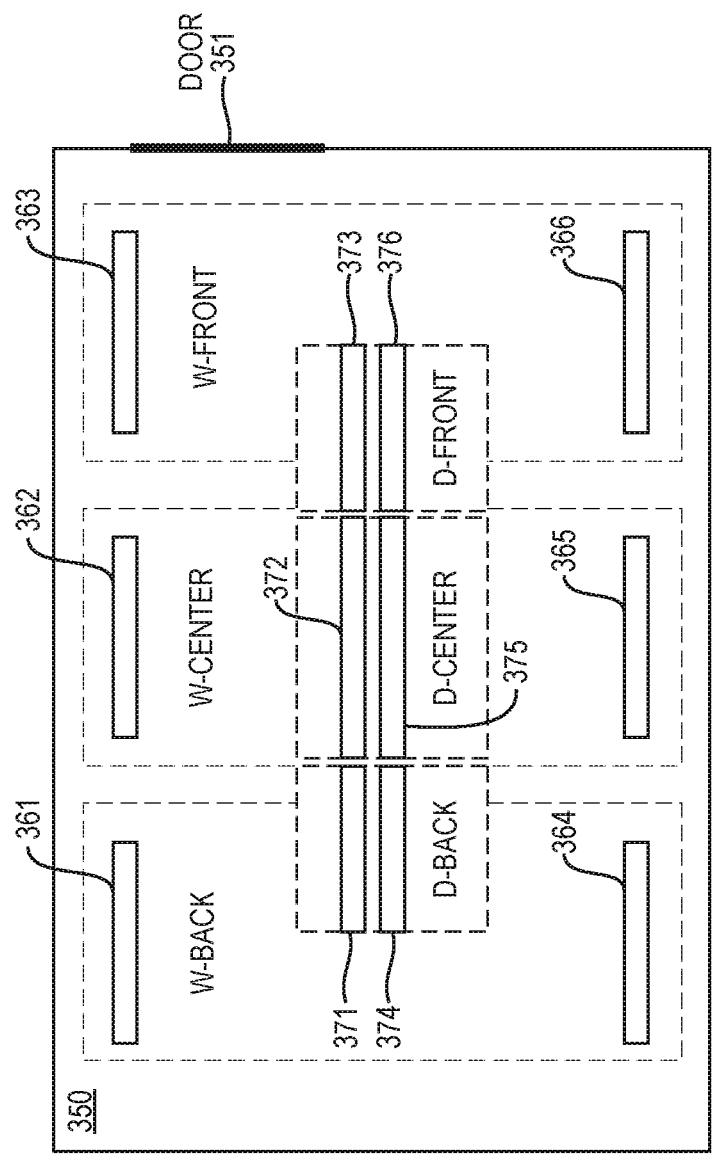
FIG. 3B shows luminaires.

FIG. 3B shows a set of luminaires. In the example shown in FIG. 3B, a room 350 is illuminated by six 5-channel wall-washing luminaires 361, 362, 363, 364, 365, 366 and two recessed downlights. The first downlight includes a front portion 373, center portion 372 and back portion 371. Likewise, the second downlight includes a front portion 376, center portion 375 and back portion 374. In FIG. 3B, each of the six wall-washing luminaires and each portion (front, center or back) of each downlight is individually controllable. In FIG. 3B, room 350 has a door 351.

In illustrative implementations of this invention, any type of luminaire may be employed, such as any one or more of the following types: LED (light-emitting diode), solid-state, halogen, incandescent, fluorescent, and electric. The luminaires may each include a dimmer, dimmer ballast or other circuitry configured to control intensity of light emitted by the luminaire. The luminaires may each include one or more color filters that tend to block light in some visible frequencies (colors) and to allow light in other visible frequencies (color) to pass, in such as way as to dynamically control or statically modify the color of light being emitted by the luminaire. Different luminaires in a room may emit different colors of light, either with or without color filtering. The luminaires may be mounted or located in any position in the room, including in the ceiling or floor, in a wall, or in a free-standing lamp. The luminaires may comprise, for example, any one or more of the following: a ceiling-mounted downlight, ceiling-mounted wallwasher light, floor-mounted wallwasher light, spotlight, track lighting, lamp, under-cabinet light, strip light, high-bay light, low-bay light, ceiling dome light, open ceiling dome light, enclosed ceiling dome light, recessed light, "canned" light, cove light, troffer, surface-mounted light, chandelier, pendant light, and sconce.

Creating Image-Based Map

Figure 4:
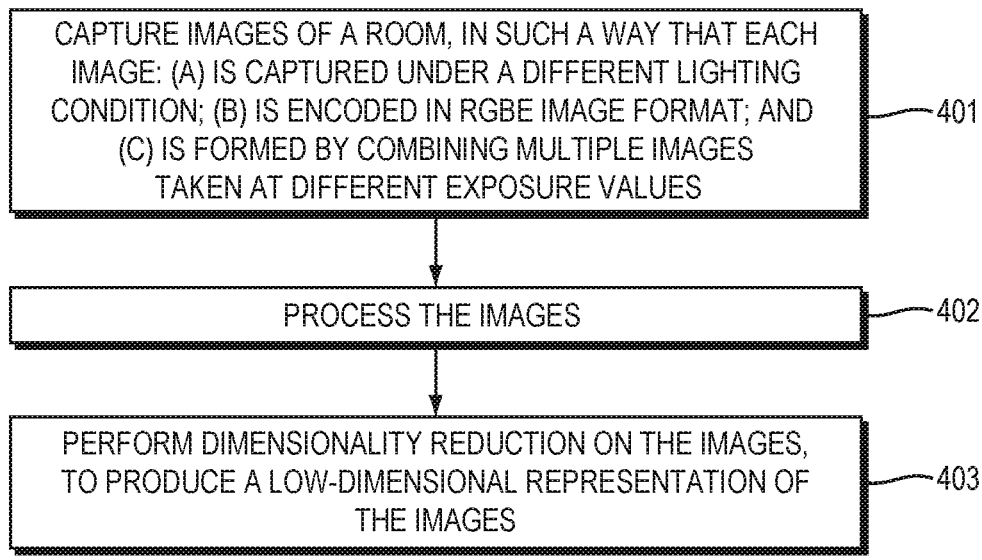
FIG. 4 shows a method for creating an image-based map.

FIG. 4 shows a method for creating an image-based map. In FIG. 4, a camera captures images of a room under different lighting scenes, and then a computer processes and reduces the dimensionality of the images. In the example shown in FIG. 4, the method includes at least the following steps: Capture images of a room, in such a way that each image: (a) is captured under a different lighting scene; (b) is encoded in RGBE image format; and (c) is formed by combining multiple images taken at different exposure values (Step 401). Process the images (Step 402). Perform dimensionality reduction on the images, to produce a low-dimensional representation of the images (Step 403).

In Step 401, the room may be illuminated by landmark lighting scenes, one scene at a time. In some cases, six landmark lighting scenes are used. The landmark lighting scenes may be created in advance, by specifying in advance the number and type of luminaires and the spatial arrangement, intensity settings and color settings of the luminaires. For instance, the landmark lighting scenes may be created by a human (e.g., the user or a lighting designer) or by a computer algorithm (e.g., an algorithm that optimizes a perception-based image quality function). In some cases, the landmark lighting scenes are created by a computer algorithm that identifies lighting configurations that maximize visibility of objects or scenes.

In a prototype of this invention, steps 401, 402, and 403 are performed as described in the following nine paragraphs.

In this prototype, a DSLR (digital single-lens reflex) camera with an ultra wide-angle lens captures images of a room under different lighting scenes. The camera is programmed with HDR (high dynamic range) firmware. In the firmware settings, the camera is configured to use nine brackets and two Exposure Value (EV) increments. Thus, for each HDR photograph, the camera takes nine images and after each image, the exposure is increased by two stops. For instance, a two stop increase may be a change in shutter speed from ⅛ of a second to ½ of a second, or from ½ of a second to 2 seconds. ISO and White balance settings are fixed to 100 and Daylight respectively. The image resolution is 5616 by 3744 pixels.

In this prototype, HDR images are computed using nine photographs for each image, and the Photosphere® command line tool. The software accesses a calibration file. The calibration file is generated by manual calibration in Photosphere®, using the camera setup and a luminance meter. The output HDR images are stored with the Radiance RGBE Encoding. In a post-processing step, the images are centered, cropped and re-sized to 512 by 512 pixels. A vignetting function for the camera lens is applied to the images. An intensity scale factor is applied, based on readings from the luminance meter to convert pixel values to units of $Wsr^{-1} m^{-2}$. This conversion (from luminance to radiance units) is desirable because analysis software (e.g., software that performs glare assessment) may expect radiometric input.

In this prototype, Radiance RGBE Encoding (.hdr) is employed for the images. RGBE image format is an improvement over the RGB standard, both regarding precision and regarding dynamic range. In RGBE image format, each color channel—red, green, and blue—has the precision of 32 Bit floating-point values instead of 8 Bit in the standard RGB encoding.

In this prototype, processing steps generate formatted datasets. The processing takes into account the logarithmic relationship of human perception and stimulus intensity as stated in Fechner's Law and uses the logarithm of the weighted channel intensities. A small offset=0.1 (which was empirically chosen) is added to avoid log(0). The following function is applied to each channel C:

$$C' = \log((C + \text{offset}))$$

In this prototype, the processed pixel matrix (height× width×3) is reshaped to a vector (1×(height*width*3)). The image vectors are concatenated to form an image data matrix (number of images×(height*width*3)). The labels of the images, which were the names of the respective lighting scenes, are stored in a separate vector (1×number of images). Then the order of the image vectors in the image data matrix and the associated labels in the label vector are jointly randomized. The randomized matrices together produce a formatted dataset.

In this prototype, the number of observations is the number of images in the dataset. Each observation contains n=height*width*3 pixel values.

In this prototype, dimensionality reduction is performed on the dataset using the Matlab® Toolbox for Dimensionality Reduction with target dimensionality of two. In this prototype, the landmark lighting scenes are visualized in the resulting low dimensional representation.

In this prototype, three different dimensionality reduction techniques for image-based mapping were employed: PCA, Isomap, and t-SNE (t-distributed stochastic neighbor embedding).

In a test of this prototype, an image dataset was created using photographs of six landmark lighting scenes and supplemental images with 100 interpolation steps, which generated a final sample size of 1491 images. In this test of the prototype, supplemental images were linear combinations of the original images. The supplemental images artificially inflated the sample size. The supplemental images showed new lighting scenes created using two lighting scenes. For each pair of images of the landmark scenes, a number of linear interpolation steps were performed. For each step, the multiplicative weight of one image was increased, and the other was decreased. We reduced the resolution of the photographs from 512 by 512 pixels to 52 by 52 pixels using a bicubic interpolation algorithm to accelerate computation.

The prototype described in the preceding nine paragraphs is a non-limiting example of this invention. This invention may be implemented in many other ways.

A wide variety of dimensionality reduction methods may be employed, to reduce the dimensions of a set of camera images (e.g. Step 403) or to reduce the dimensions of user ratings (e.g., Step 503). For instance, the dimensionality reduction algorithm may comprise PCA, t-SNE (t-distributed stochastic neighbor embedding), Isomap, Landmark Isomap, C Isomap, diffusion maps, LLE (local linear embedding), Hessian LLE, LTSA (local tangent space alignment), MVU (maximum variance unfolding), Laplacian eigenmaps, kernel PCA, ICA (independent component analysis), MDS (multi-dimensional scaling), or an autoencoder.

In some implementations, the high-dimensional dataset of images (which is an input to the dimensionality reduction algorithm) includes only images of the landmark lighting scenes (e.g., six lighting scenes). For instance, PCA may perform well with only six landmark lighting scenes and no supplemental scenes.

In some other implementations, the high-dimensional dataset of images (which is an input to the dimensionality reduction algorithm) includes both (a) images of the landmark lighting scenes (e.g., six landmark lighting scenes) and (b) supplemental images created by interpolation from the landmark scenes. For instance, Isomap performs better when the high-dimensional dataset of images includes supplemental images (which were created by interpolation).

In some implementations, spatial resolution of the images is compressed to as low as 6 by 6 pixels and this low spatial resolution is sufficient for accurate estimates of human perception of lighting, based on an image-based map. In some implementations, there is a tradeoff: (a) on the one hand, increasing spatial resolution of the images increases accuracy of estimates of human perception of lighting, based on a image-based map; and (b) on the other hand, a lower spatial resolution reduces the number of computations and increases computational speed.

In some implementations, estimates of human perception of lighting, based on an image-based map, are more accurate where the images show the scene from a position where the worker sits or from a position where the worker is most likely to view the scene.

In some implementations, estimates of human perception of lighting, based on an image-based map, are more accurate where HDR images are employed, Alternatively, instead of employing HDR images, the camera may capture standard digital images. In some cases, if standard (non-HDR) images are captured, it is advantageous to capture under-exposed images. For instance, where standard 8-bit encoding is used for the images, the system may perform better when the images are under-exposed.

Creating Rating-Based Map

Figure 5:
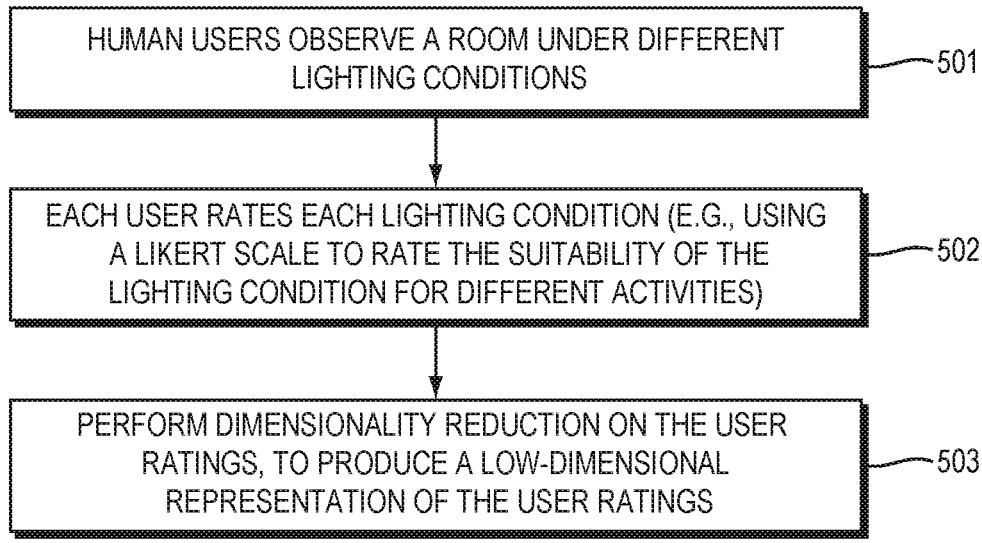
FIG. 5 shows a method for creating a rating-based map.

FIG. 5 shows a method for creating a rating-based map. In FIG. 5, user ratings of different lighting scenes in a room are acquired, and then a computer reduces the dimensionality of the user ratings.

In the example shown in FIG. 5, the method includes at least the following steps: Human users observe a room under different lighting scenes (Step 501). Each user rates each lighting scene. For instance, each user may employ a Likert scale to rate the suitability of the lighting scene for different activities (Step 502). A computer may perform dimensionality reduction on the user ratings, to produce a low-dimensional representation of the user ratings (Step 503).

In a test of a prototype of this invention, steps 501, 502, and 503 were performed as described in the following three paragraphs.

In a test of this prototype, ratings of user perception for six lighting scenes were collected and analyzed. In this test of the prototype, seventeen participants (from 20 to 35 years old) rated the suitability of lighting scenes for fourteen office tasks. They recorded their opinions on a five-point Likert scale from strongly disagree to strongly agree, including an option to give no answer. Each participant rated all conditions in random order. The office tasks in the questionnaire were chosen according to guesses of potentially relevant contextual dimensions in an office. The tasks were: (1) casual conversation with a friend; (2) informal phone conversation; (3) coffee break; (4) sketching on paper; (5) study/memorization; (6) hand-craft; (7) formal phone conversation; (8) brainstorming in a group; (9) programming/CAD or video editing on a computer; (10) informal presentation with slides; (11) creative task using a computer; (12) (routine) email on computer; (13) formal presentation with slides; and (14) formal phone conversation In this test of the prototype, PCA was applied to discover latent dimensions of user judgment. This analysis was performed using the PSYCH package in R26 and the Varimax rotation method. The data was formatted in a way that each observation contained ratings for all questions of one subject for one lighting scene.

In this test of the prototype, a two-dimensional perceptual representation was established using the first two rotated components. The average component scores of each lighting scene determined their coordinates in this representation. The first two components were named Focus and Casual because focused activities (e.g. sketching on paper, study/memorization, formal phone conversation) loaded with the first component and casual activities (e.g. casual conversation with a friend, informal phone conversation, coffee break) loaded with the second component. Focus configurations used more uniform and brighter lighting, whereas Casual configurations used lighting with warm color temperature.

The prototype (and the test of the prototype) described in the preceding three paragraphs are non-limiting examples of this invention. This invention may be implemented in many other ways.

Transforming Image-Based Map

As noted above, an image-based map for a new room may be created by: (a) a camera capturing a set of images of the new room, where each image is captured under a different lighting scene; and (b) a computer performing a dimensionality-reduction algorithm on the set of images. The result is a low-dimensional representation of the set of images, which we sometimes call an "image-based map".

In illustrative implementations, the image-based map for the new room is not initially aligned with how humans would perceive lighting scenes in the new room.

In some cases, this image-based map is then transformed, in order to align it with how users would perceive the lighting scenes in the new room. This may be done in at least four ways.

Figure 6:
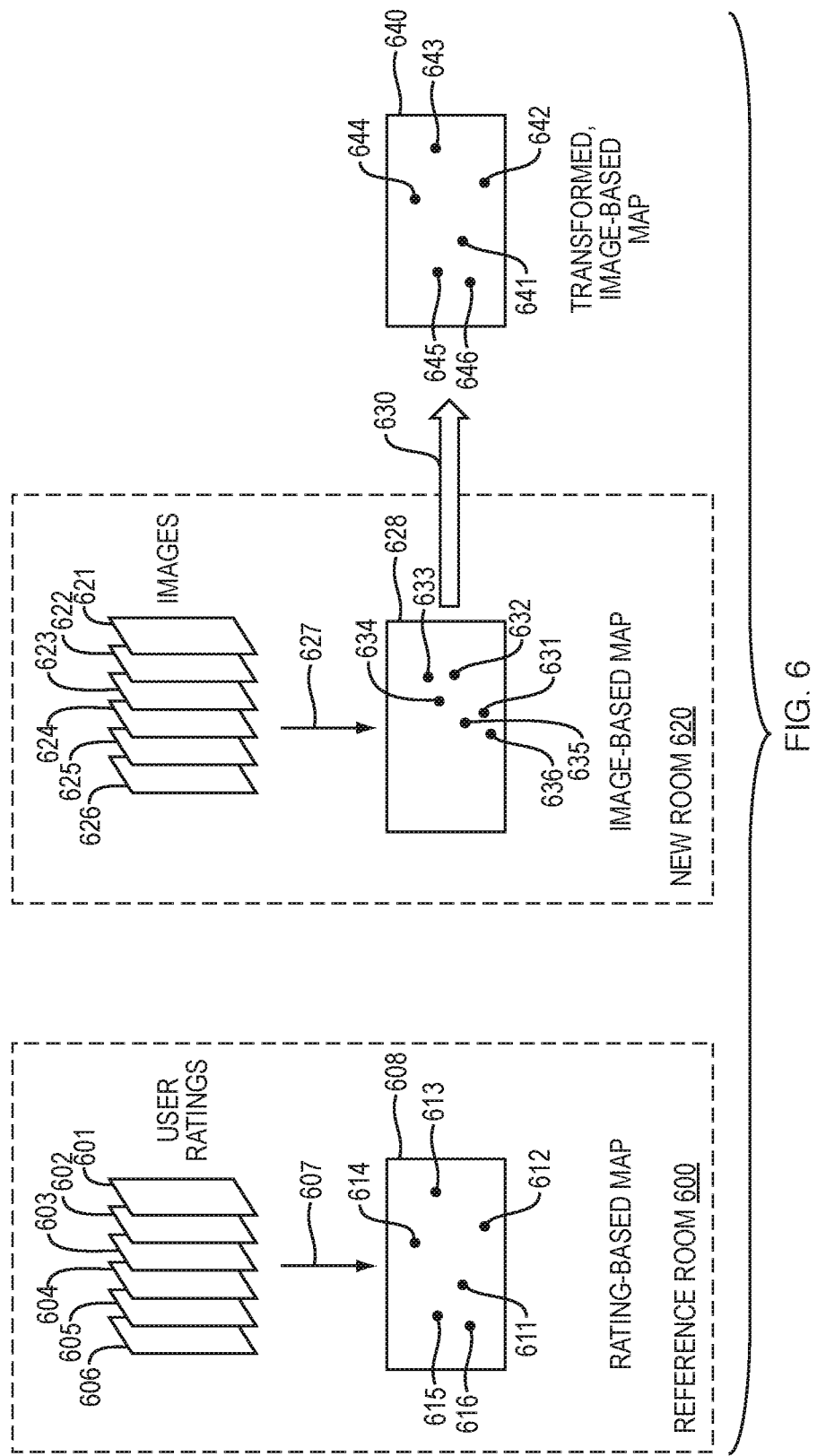

First, in some cases, the image-based map for the new room is transformed by registering it with a rating-based map for a different room (reference room). This approach is shown in FIG. 6.

Figure 7:
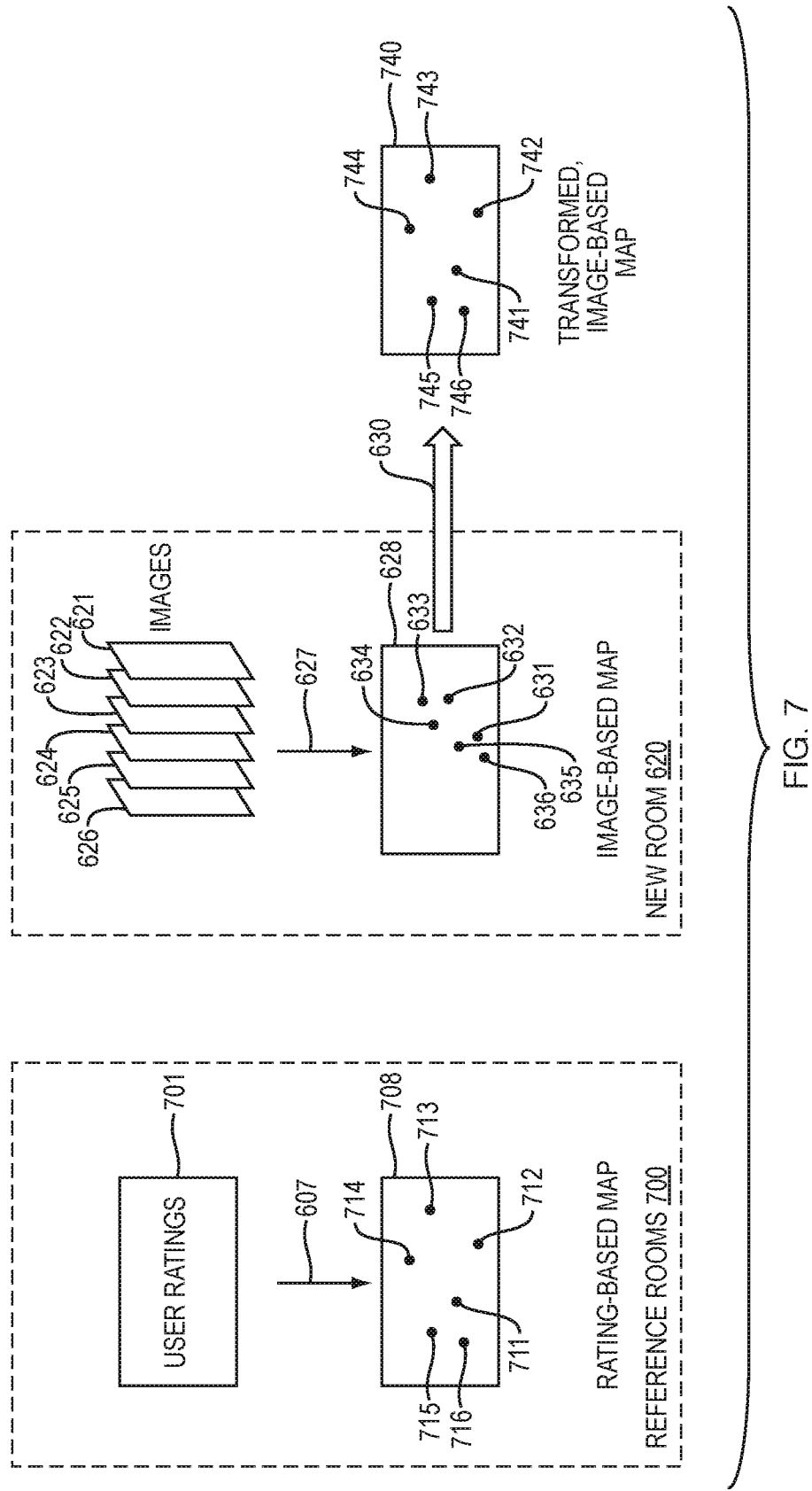

Second, in some cases, the image-based map for the new room is transformed by registering it with a rating-based map based on user ratings of lighting conditions in multiple other rooms (reference rooms). This approach is shown in FIG. 7.

Third, in some cases, the image-based map for the new room is transformed by registering it with a rating-based map for the new room, where the rating-based map is created by: (a) gathering user ratings for as few as three lighting scenes for the new room; and (b) then applying dimensionality reduction. This approach is show in FIG. 8.

Fourth, in some cases, the image-based map for the new room is transformed by a trained machine learning algorithm. This approach is shown in FIG. 9.

Figure 10:
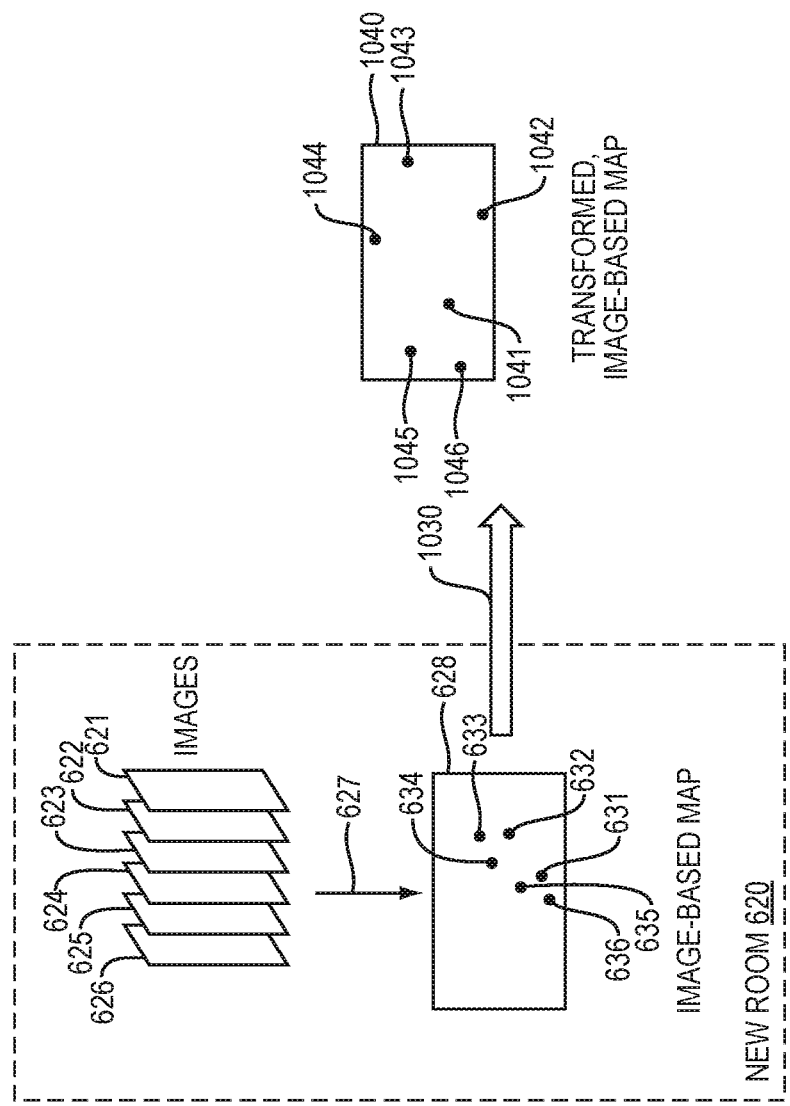

Alternatively, in some cases, the image-based map for the new room is transformed without reference to any user ratings (and thus without any attempt to align with human perception of lighting scenes). For instance, the transformation may simply maximize perceptual difference between lighting scenes. This approach (transforming without reference to user ratings) is shown in FIG. 10.

FIGS. 6, 7, 8, 9B, and 10 each show a method of creating an image-based map and then transforming it. In FIGS. 6, 7, 8, and 9B, the transformation causes the image-based map to become aligned with how humans perceive a scene.

In FIGS. 6, 7 8, 9A and 10, an image-based map 628 for a new room 620 is created by: (a) capturing images 621, 622, 623, 624, 625, 626, where each image is captured under a different lighting scene; and (b) applying a dimensionality-reduction algorithm 627 to the set of images. The result is a low-dimensional representation of the set of images. This low-dimensional representation 628 is an example of an "image-based map".

In FIGS. 6, 7 8, 9A and 10, each datapoint in image-based map 628 corresponds to a specific image and thus also corresponds to a specific lighting scene. For instance, in image-based map 628: (a) datapoint 631 corresponds to image 621 and to the lighting scene captured by image 621; (b) datapoint 632 corresponds to image 622 and to the lighting scene captured by image 622; (c) datapoint 633 corresponds to image 623 and to the lighting scene captured by image 623; (d) datapoint 634 corresponds to image 624 and to the lighting scene captured by image 624; (e) datapoint 635 corresponds to image 625 and to the lighting scene captured by image 625; and (f) datapoint 636 corresponds to image 626 and to the lighting scene captured by image 626.

In FIG. 6, registration 630 is performed to align an image-based map 628 for a new room 620 with a rating-based map 608 for a different room (reference room) 600.

In FIG. 6, the rating-based map 608 for reference room 600 is created by: (a) gathering user ratings of different lighting scenes for the reference room; and (b) applying a dimensionality-reduction algorithm 607 to the user ratings. The result is a low-dimensional representation of the user ratings. This low-dimensional representation 608 is an example of a "rating-based map".

In FIG. 6, a set of user ratings is gathered for each lighting scene. For instance, in some use scenarios, a group of users each rate a lighting scene by employing a five-point Likert scale (from strongly disagree to strongly agree) to rank the lighting scene in terms of how much the lighting scene contributes to or is conducive for each of 14 activities. In FIG. 6, the user ratings for the reference room may comprise: (a) user ratings 601 for a first lighting scene for the reference room; (b) user ratings 602 for a second lighting scene for the reference room; (c) user ratings 603 for a third lighting scene for the reference room; (d) user ratings 604 for a fourth lighting scene for the reference room; (e) user ratings 605 for a fifth lighting scene for the reference room; and (f) user ratings 606 for a sixth lighting scene for the reference room.

In FIG. 6, each datapoint in rating-based map 608 corresponds to user ratings for a specific lighting scene. For instance, in rating-based map 608: (a) datapoint 611 corresponds to user ratings 601 for the first lighting scene for the reference room; (b) datapoint 612 corresponds to user ratings 602 for the second lighting scene for the reference room; (c) datapoint 613 corresponds to user ratings 603 for the third lighting scene for the reference room; (d) datapoint 614 corresponds to user ratings 604 for the fourth lighting scene for the reference room; (e) datapoint 615 corresponds to user ratings 605 for the fifth lighting scene for the reference room; and (f) datapoint 616 corresponds to user ratings 606 for the sixth lighting scene for the reference room.

In FIG. 6, image-based map 628 for new room 620 is not initially aligned with human perception of lighting scenes. In FIG. 6, registration 630 is performed to align image-based map 628 for new room 620 with rating-based map 608 for reference room 600. This registration outputs a transformed (registered) image-based map 640. This registration causes the transformed, image-based map 640 to approximate a low-dimensional representation of how users would perceive lighting scenes in new room 620.

In FIG. 7, registration 630 is performed to align an image-based map 628 for a new room 620 with a rating-based map 708 for multiple other rooms (reference rooms) 700.

In FIG. 7, a rating-based map 708 for reference rooms 700 is created by: (a) gathering user ratings of different lighting scenes for the reference rooms; and (b) applying a dimensionality-reduction algorithm 607 to the user ratings. The result is a low-dimensional representation of the user ratings. This low-dimensional representation 708 is another example of a "rating-based map".

In FIG. 7, user ratings 701 may include user ratings for each lighting scene for each reference room.

In FIG. 7, each datapoint in rating-based map 708 corresponds to user ratings for a specific lighting scene for one or more of the reference rooms. For instance, in rating-based map 708, datapoints 711, 712, 713, 714, 715, 716 correspond to user ratings for a first, second, third, fourth, fifth, sixth and seventh lighting scene, respectively.

In FIG. 7, image-based map 628 for new room 620 is not initially aligned with human perception of lighting scenes. In FIG. 7, registration 630 is performed to align image-based map 628 (for new room 620) with rating-based map 708 (for reference rooms 700). This registration outputs a transformed (registered) image-based map 740. Again, this registration causes the transformed, image-based map 740 to approximate a low-dimensional representation of how users would perceive lighting scenes in new room 620.

In FIGS. 6 and 7, new room 620 is different than reference room 600 and different than each of reference rooms 700. In some cases, each reference room in FIGS. 6 and 7 differs from new room 620 in at least one or more of the following respects: (a) size of room; (b) shape of room; (c) number, type or position of luminaires in the room; (d) number, shape or position of any windows in the room; (e) color or type of paint in the room; (f) color or type of floor or floor covering in the room; and (g) size, shape, type, color or position of furniture in the room.

The methods shown in FIGS. 6 and 7 have many advantages. Among other things, they may be employed to create a perceptual control space for lighting for a new room, without acquiring any user ratings for the new room. Put differently, once user ratings have been gathered for lighting scenes for one or more reference rooms, these user ratings may be generalized to other rooms (e.g., if the rooms are similar). This facilitates efficient and automated deployment of the lighting control system to new rooms.

The methods shown in FIGS. 6 and 7 may estimate human perception of lighting scenes in a new room more accurately where the new room: (a) is the same size as, or smaller than, the reference room(s); and (b) has similar lighting scenes and a similar luminaire configuration as the reference room(s).

Figure 8:
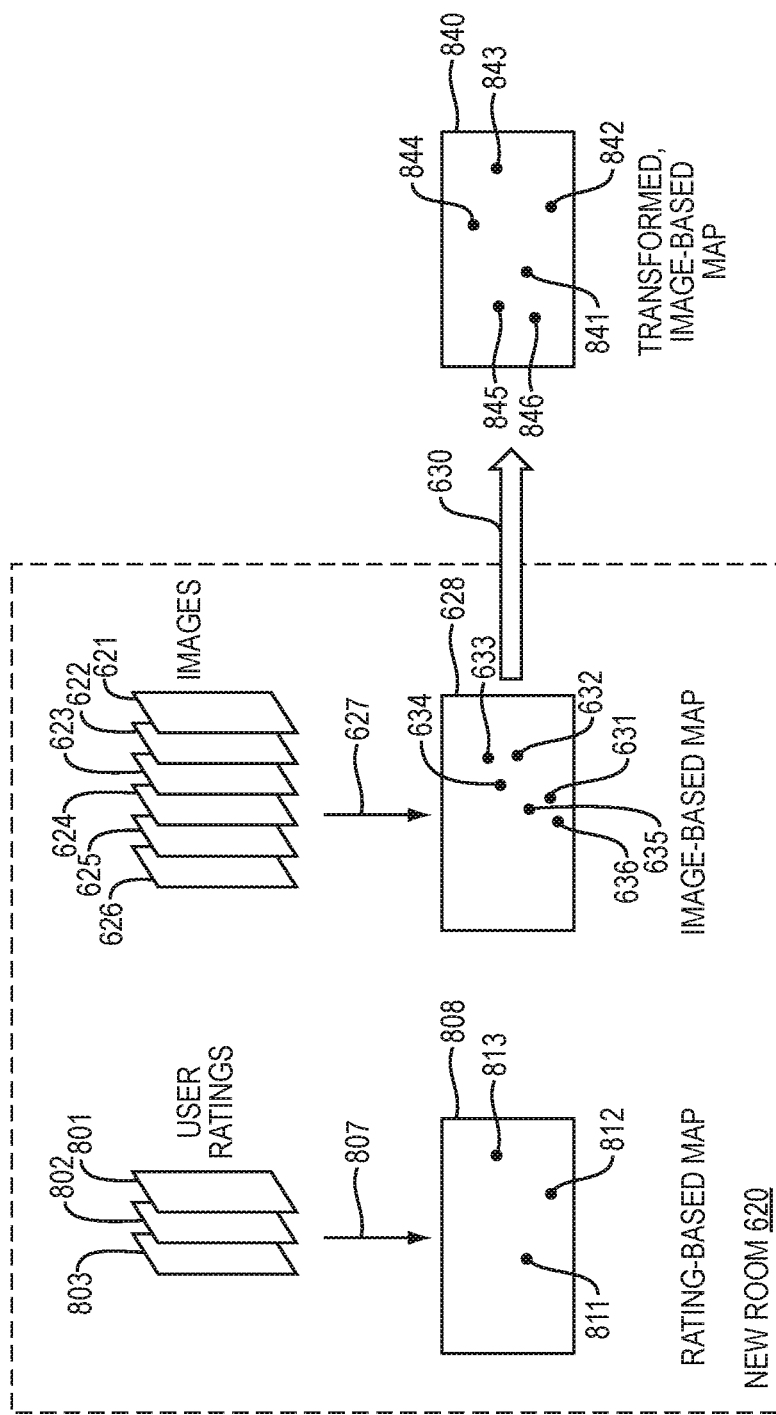

In FIG. 8, registration is performed to align an image-based map 628 for a new room 620 with a rating-based map 808 for the new room 620, where the rating-based map is derived from user ratings for as few as three lighting scenes.

In FIG. 8, a rating-based map 808 for new room 620 is created by: (a) gathering user ratings for as little as three different lighting scenes for the new room; and (b) applying a dimensionality-reduction algorithm 807 to the user ratings. The result is a low-dimensional representation of the user ratings. This low-dimensional representation 808 is an example of a "rating-based map".

In FIG. 8, a set of user ratings is gathered for each lighting scene. For instance, in some use scenarios, a group of users each rate a lighting scene by employing a five-point Likert scale (from strongly disagree to strongly agree) to rank the lighting scene in terms of how much the lighting scene contributes to or is conducive for each of 14 activities. In FIG. 8, the user ratings for the new room may comprise: (a) user ratings 801 for a first lighting scene for new room 620; (b) user ratings 802 for a second lighting scene for new room 620; and (c) user ratings 803 for a third lighting scene for new room 620.

In FIG. 8, each datapoint in rating-based map 808 corresponds to user ratings for a specific lighting scene for the reference room. For instance, in rating-based map 808: (a) datapoint 811 corresponds to user ratings 801 for a first lighting scene for new room 620; (b) datapoint 812 corresponds to user ratings 802 for a second lighting scene for new room 620; and (c) datapoint 813 corresponds to user ratings 803 for a third lighting scene for new room 620.

In FIG. 8, there is one image per lighting scene. In FIG. 8, the number of images (and thus the number of lighting scenes) employed to create image-based map 628 is greater than the number of lighting scenes employed to create rating-based map 808. For instance, in some cases in FIG. 8: (a) user ratings are gathered for only three lighting scenes; and (b) images are captured for more than three lighting scenes (e.g., six or more lighting scenes).

In FIG. 8, image-based map 628 for new room 620 is not initially aligned with human perception of lighting scenes. In FIG. 8, registration 630 is performed to align image-based map 628 for new room 620 with rating-based map 808 for new room 620. This registration outputs a transformed (registered) image-based map 840. This registration causes the transformed, image-based map 840 to approximate a low-dimensional representation of how users would perceive lighting scenes in new room 620.

The method shown in FIG. 8 has many advantages. Among other things: (a) it may be performed with user ratings for as few as three lighting scenes for the new room; and (b) it may be performed even if the new room is quite dissimilar from any previous room in which lighting control system has been deployed.

Alternatively, a trained machine learning algorithm may transform an image-based map for a new room in such a way that the resulting map is aligned with how users would perceive lighting scenes in the new room. The machine learning algorithm may be trained on a large dataset of labeled images of a wide variety of lighting scenes in a wide variety of rooms. In some cases, the training dataset may include images of only two, three, four, five or six lighting scenes per room. In some cases, in the training dataset, each image: (a) may capture a lighting scene for a room; and (b) may be labeled with user ratings for that lighting scene for that room.

In illustrative implementations of this invention, a wide variety of machine learning algorithms may be employed for this purpose (transforming an image-based map for a new room to align it with how users would perceive lighting scenes in the new room). For instance, in some cases, the machine learning algorithm comprises a CNN (convolutional neural network), such as an LeNet, AlexNet, VGG-16 (Visual Geometry Group 16-layer neural network), VGG-19 (Visual Geometry Group 19-layer neural network), ResNet, GoogleNet (e.g., Inception 3), multi-stream CNN, multi-stream multi-channel CNN, FCN (fully convolutional network), or U-Net FCN. Or, for instance, the machine learning algorithm may comprise any other neural network or any other algorithm for supervised machine learning, such as an RNN (recurrent neural network), RNN with LSTM (long short term memory), RNN with Gated Recurrent Unit, MLP (multi-layered perceptron), ANN (artificial neural network), or SVM (support vector machine).

FIG. 9A shows a machine learning algorithm 902 being trained on a dataset 901 of images and user perception data.

FIG. 9B shows a trained learning machine algorithm performing a transformation 930. The transformation 930 takes, as an input, an image-based map 628 for a new room 620. The transformation 930 outputs a transformed image-based map 940, which approximates a low-dimensional representation of how users would perceive lighting scenes in new room 620.

The method shown in FIG. 9 has many advantages. Among other things, once the machine learning algorithm has been trained, it may be employed to create a perceptual control space for lighting for a new room, without acquiring any user ratings for the new room.

Alternatively, in some cases, an image-based map is transformed without taking into account any user ratings (and thus without any attempt to align with human perception of lighting scenes). As a non-limiting example, the transformation may simply maximize perceptual difference between lighting scenes. For instance, the transformation may maximize the sum of the magnitude of the pairwise distances between datapoints in the image-based map, optionally subject to one or more constraints. Or, for instance, the transformation may maximize the sum of the squares of the pairwise distances between datapoints in the image-based map, optionally subject to one or more constraints. This approach (transforming without any attempt to align with human perception of lighting scenes) may be well-suited for use scenarios in which the user is not aware of control axes of the lighting control. This may occur in use scenarios where the control axes of the lighting control are employed only in the backend, not in a user interface with which the user interacts.

In FIG. 10, an image-based map 628 for a new room 620 is transformed without reference to any user ratings or other data regarding human perception of lighting scenes. The transformation 1030 may result in a transformed, image-based map 1040 that is not aligned with how humans perceive lighting scenes.

In FIGS. 6, 7, 8, 9A and 10, there is a one-to-one mapping between points in the (pre-transform) image-based map 628 and points in the transformed image-based map (e.g., 640, 740, 840, 940, 1040). For instance: (a) in FIG. 6, pre-transform datapoints 631, 632, 633, 634, 635, 636 map to transformed datapoints 641, 642, 643, 644, 645, 646, respectively; (b) in FIG. 7, pre-transform datapoints 631, 632, 633, 634, 635, 636 map to transformed datapoints 741, 742, 743, 744, 745, 746, respectively; (c) in FIG. 8, pre-transform datapoints 631, 632, 633, 634, 635, 636 map to transformed datapoints 841, 842, 843, 844, 845, 846, respectively; (d) in FIG. 9, pre-transform datapoints 631, 632, 633, 634, 635, 636 map to transformed datapoints 941, 942, 943, 944, 945, 946, respectively; and (e) in FIG. 10, pre-transform datapoints 631, 632, 633, 634, 635, 636 map to transformed datapoints 1041, 1042, 1043, 1044, 1045, 1046, respectively.

In FIGS. 6, 7 and 8, the same lighting scenes which are rated by users to create the rating-based maps may also be used to create (or help create) the image-based map. For instance, in FIG. 6, the lighting scenes captured in images

621, 622, 623, 624, 625, 626 may also be rated by users to create user ratings 601, 602, 603, 604, 605, 606, respectively. Likewise, in FIG. 8, the lighting scenes captured in images 621, 622, 623 may also be rated by users to create user ratings 801, 802, 803. In FIG. 8, more lighting scenes are employed to create the image-based map than are employed to create the rating-based map. In FIG. 8, the lighting scenes captured in images 624, 625, 626, respectively, are used to help create the image-based map but not the rating-based map.

In FIGS. 6, 7, 8, 9A and 10, image-based map 628 has two dimensions. Likewise, in FIGS. 6, 7 and 8, the rating-based map (e.g., 608, 708, 808) has two dimensions. However, this invention is not limited to two dimensional image-based maps or rating-based maps.

In some cases, for a given installation of luminaires, the number of dimensions of image-based map 628 is less than the number of color channels that are controllable by a computer in the given installation. For example, if a specific installation of luminaires includes only four luminaires and if each luminaire has only three color channels that are controllable by a computer, then the number of color channels that are controllable by a computer in the specific installation is twelve.

In some cases, for a given installation of luminaires, the number of dimensions of the transformed, image-based map (e.g., 640, 740, 840, 940, 1040) is less than the number of color channels that are controllable by a computer in the given installation.

In some cases, for a given installation of luminaires, the number of dimensions of the rating-based map (e.g., 608, 708, 808) is less than the number of color channels that are controllable by a computer in the given installation.

In some cases, the number of dimensions of image-based map 628 is less than the number of images that are taken as an input by dimensionality reduction algorithm 627 when creating image-based map 628. In some cases, the number of dimensions of the transformed, image-based map (e.g., 640, 740, 840, 940, 1040) is less than the number of images that are taken as an input by dimensionality reduction algorithm 627 when creating image-based map 628.

In some cases, the number of dimensions of a rating-based map (e.g., 608, 708, 808) is less than the number of lighting scenes for which user ratings were taken as an input by a dimensionality reduction algorithm (e.g., 607, 807) when creating the rating-based map.

In some cases, the image-based map 628, the transformed image-based map (e.g., 640, 740, 840, 940, 1040) and the rating-based map (e.g., 608, 708, 808) have more dimensions than are used in the control space for the lighting system. For instance, in some cases: (a) the image-based map and the rating-based map are each calculated by Principal Component Analysis and each have a large number of dimensions, the dimensions being principal components; and (b) only a certain number of the principal components (e.g., the first, second and third principal components) of the transformed, image-based map are employed as control axes in the lighting control space and the remaining principal components are not.

As used herein, "relevant dimensions" means: (a) axes of a transformed, image-based map that are employed as control axes in the lighting control space; (b) corresponding axes of a (pre-transformation) image-based map; and (c) corresponding axes of a rating-based map (if there is a rating-based map).

In some cases, the number of control axes in the lighting control space (and thus the number of relevant dimensions of the image-based map and the number of relevant dimensions of the transformed, image-based map) is less than the number of color channels that are controllable by a computer in the given installation.

In some cases: (a) an image-based map is registered with a rating-based map; and (b) the number of control axes in the lighting control space (and thus the number of relevant dimensions of the rating-based map) is less than the number of color channels that are controllable by a computer in the given installation.

In some cases, the number of control axes in the lighting control space (and thus the number of relevant dimensions of the image-based map 628 and the number of relevant dimensions of the transformed, image-based map) is less than the number of images that are taken as an input by dimensionality reduction algorithm 627 when creating image-based map 628.

In some cases, the number of control axes in the lighting control space (and thus the number of relevant dimensions of the rating-based map) is less than the than the number of lighting scenes for which user ratings were taken as an input by a dimensionality reduction algorithm (e.g., 607, 807) when creating the rating-based map.

In some cases, the number of dimensions of the image-based map is equal to the number of dimensions of the transformed image-based map and is also equal to the number of dimensions of the rating-based map.

In some cases, the number of relevant dimensions of the image-based map is equal to the number of relevant dimensions of the transformed image-based map and is also equal to the number of relevant dimensions of the rating-based map.

In some cases, the number of dimensions in each of the image-based map, transformed image-based map, and rating-based map is two, or is three, or is four, or is five, or is six, or is seven, or is eight, or is nine, or is ten, or is greater than ten.

In some cases, the number of control axes in the lighting control space is two, or is three, or is four, or is five, or is six, or is seven, or is eight, or is nine, or is ten, or is greater than ten.

In some cases, the number of relevant dimensions (in each of the image-based map, transformed image-based map and rating-based map) is two, or is three, or is four, or is five, or is six, or is seven, or is eight, or is nine, or is ten, or is greater than ten.

As noted above, in FIGS. 6, 7, and 8, registration 630 is performed to align (register) the image-based map 628 with the rating-based map (e.g., 608, 708, 808).

In some cases, registration 630 involves Procrustes analysis (e.g., an ordinary Procrustes analysis or a generalized Procrustes analysis). The Procrustes analysis may involve optimally translating, rotating and scaling the image-based map, in order to minimize the Procrustes distance between the image-based map and the rating-based map.

Alternatively, registration 630 may comprise any method for aligning or registering two databases. In some cases, registration 630 is performed by detecting corresponding features in the rating-based map and the image-based map. For instance, the corresponding features may be points or lines of points. Registration 630 may involve performing rotation, translation, scaling or other affine transformations of the image-based map. In some cases, registration 630 is achieved by a linear transformation (or by a non-linear transformation) of the image-based map. In some cases, registration 630 involves warping of local regions of the image-based map. For purposes of registration 630: (a) the image-based map 628 and the rating-based map (e.g., 608, 708, 808) may each be considered an "image"; and (b) any method of image registration may be employed to register or align these two "images".

Dissimilarity

In many use scenarios, the transformed, image-based map (e.g., 640, 740, 840) which results from registration is similar to—but not identical to—the rating-based map (e.g., 608, 708, 808). In some cases, even though the two maps are similar, none of the datapoints in the transformed, image-based map (e.g., 640, 740, 840) have identical coordinates to corresponding datapoints in the rating-based map (e.g., 608, 708, 808). In some other cases, at least three datapoints in the transformed, image-based map (e.g., 640, 740, 840) have identical coordinates to corresponding datapoints in the rating-based map (e.g., 608, 708, 808). In many use scenarios, even though the two maps are similar, most datapoints in the transformed, image-based map (e.g., 640, 740, 840) have different coordinates than the coordinates of corresponding datapoints in the rating-based map (e.g., 608, 708, 808).

In some implementations of this invention: (a) both the rating-based map and the transformed, image-based map are two-dimensional; and (b) the dissimilarity between them may be quantified by what we call the "Dissimilarity Value" D.

The Dissimilarity Value D is a measure of error which indicates the difference between two two-dimensional representations. For instance, if a rating-based map and a transformed, image-based map are both two-dimensional, then this measure D may evaluate the dissimilarity of the relative positions of the lighting scenes in the rating-based map and the transformed, image-based map.

To compute D, first center and normalize each two-dimensional representation (which we sometimes call a 2D map) as follows: Calculate the centroid $[C_x, C_y]$ of the lighting scenes for the 2D map using $$[C_x, C_y] = \left[\frac{1}{N}\sum_{j=1}^{N} S_{j,x}, \frac{1}{N}\sum_{j=1}^{N} S_{j,y}\right] = [\bar{S}_x, \bar{S}_y],$$

where N is the number of lighting scenes and $S_j=[S_{j,x}, S_{j,y}]$ is the x,y-coordinates of the point (in the 2D map) that corresponds to the j-th lighting scene. Apply an offset to the 2D map so that the centroid becomes the origin. Then normalize the 2D map so that the coordinates of the lighting scenes are in the range [−1, 1]. This normalization is achieved by dividing the x,y-coordinates with the maximum x- and y-value, respectively.

To compute D, the centering and normalizing described in the preceding paragraph is performed for both the rating-based map and the transformed, image-based map, resulting in $S'_{Rate}$ and $S''_{img}$, where $S'_{Rate}$ is the normalized rating-based map and $S''_{img}$ is the normalized, transformed, image-based map.

As used herein, the "Dissimilarity Value" D means:

$$D = \frac{\sum_{d=1}^{2}\sum_{j=1}^{N}(S'_{Rate,j,d} - S''_{img,j,d})^2}{\sum_{d=1}^{2}\sum_{j=1}^{N}(S'_{Rate,j,d})^2}$$

For purposes of this definition of "Dissimilarity Value" D, if the number of lighting scenes represented in the image-based map is different than number of lighting scenes represented in the rating-based map, then: (a) only lighting scenes that are represented in both the rating-based map and the transformed, image-based map are taken into account in the computation of Dissimilarity Value" D; and (b) all other lighting scenes are disregarded in that computation.

In some implementations of this invention, the Dissimilar Value D for the dissimilarity between a transformed, image-based map and a rating-based map (with which the image-based map is registered) is less than or equal to 0.09, or is less than or equal to 0.08, or is less than or equal to 0.07, or is less than or equal to 0.06, or is less than or equal to 0.05, or is less than or equal to 0.04, or is less than or equal to 0.03, or is less than or equal to 0.02, or is less than or equal to 0.01, or is less than or equal to 0.005, or is less than or equal to 0.001. The preceding sentence applies to, among other things, each example shown in FIGS. 6, 7 and 8.

In some cases, performing registration reduces the Dissimilarity Value. For instance, in some cases: (a) an image-based map is registered with a rating-based map, resulting in a transformed, imaged-based map; and (b) the Dissimilarity Value (after the registration) between the rating-based map and the transformed, image-based map is less than the Dissimilarity Value (before the registration) between the rating-based map and the image-based map.

Lighting Control

Figure 11A:
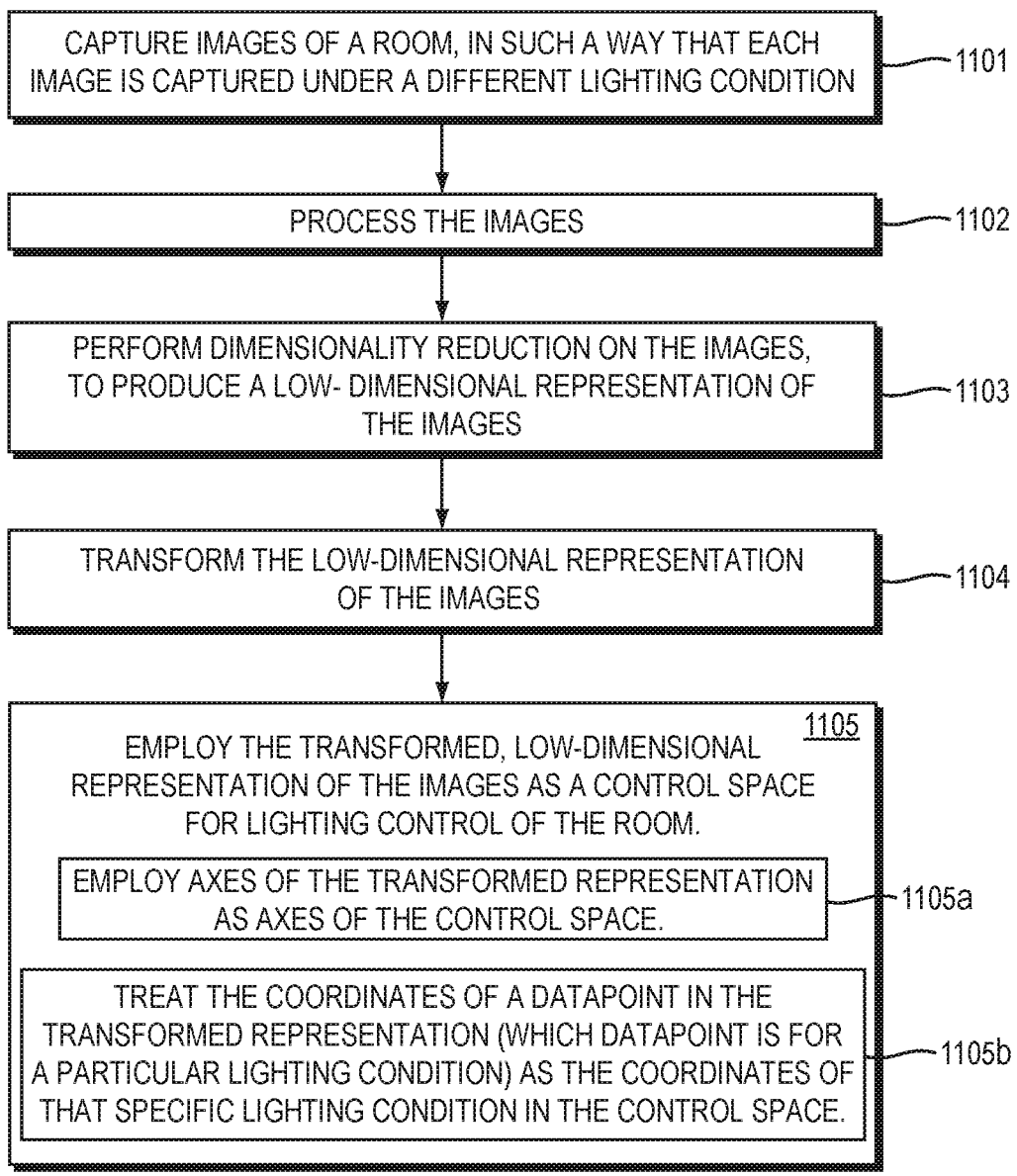
FIG. 11A shows a method of identifying a control space for lighting control.

FIG. 11A shows a method of identifying a control space for lighting control. In the example shown in FIG. 11A, the method includes at least the following steps: Capture images of a room, in such a way that each image is captured under a different lighting scene (Step 1101). Process the images (Step 1102). Perform dimensionality reduction on the images, to produce a low-dimensional representation of the images (Step 1103). Transform the low-dimensional representation of the images (Step 1104). Employ the transformed, low-dimensional representation of the images as a control space for lighting control of the room (Step 1105). For instance, in some cases, employ axes of the transformed representation as axes of the control space (Step 1105a). Or, in some cases, treat the coordinates of a datapoint in the transformed representation (which datapoint is for a particular lighting scene) as the coordinates of that specific lighting scene in the control space (Step 1105b).

Figure 11B:
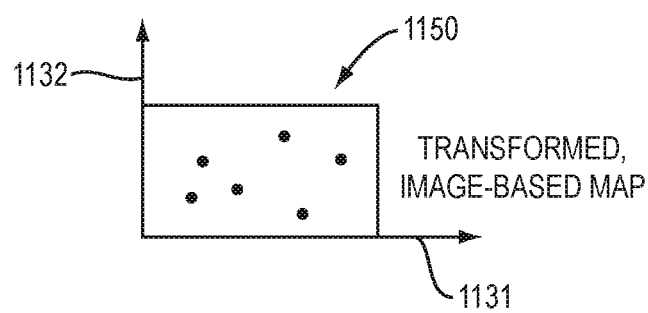
FIG. 11B shows axes of a transformed, image-based map.

In the example shown in FIG. 11B, a transformed, image-based map 1150 has axes 1131 and 1132. These axes may be employed as control axes for a lighting control system. For instance, in this lighting control system, a target lighting scene may be described by the scene's coordinates along axes 1131 and 1132, respectively.

Figure 12:
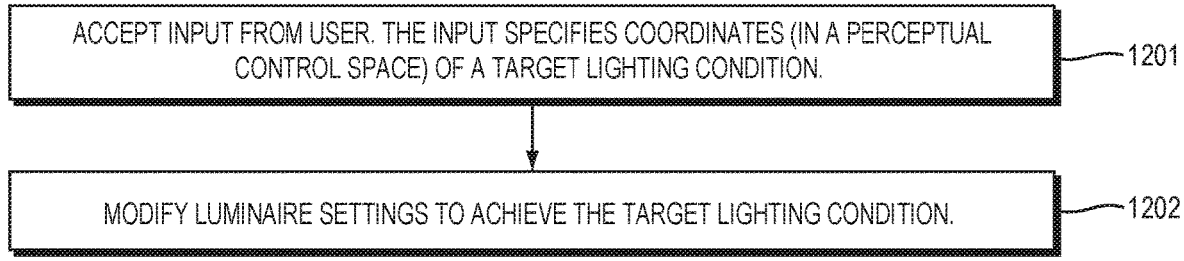
FIG. 12 shows a method of lighting control, in which a user inputs coordinates of a target lighting scene.

FIG. 12 shows a method of lighting control, in which a user inputs coordinates of a target lighting scene. In the example shown in FIG. 12, the method includes at least the following steps: Accept input from user, where the input specifies coordinates (in a perceptual control space) of a target lighting scene (Step 1201). Modify luminaire settings to achieve the target lighting scene (Step 1202). Thus, in FIG. 12, a user may input coordinates of a target lighting scene, where the coordinates are expressed in terms of position along perceptual control axes (e.g., Focus and Restore) of the perceptual control space.

Figure 13:
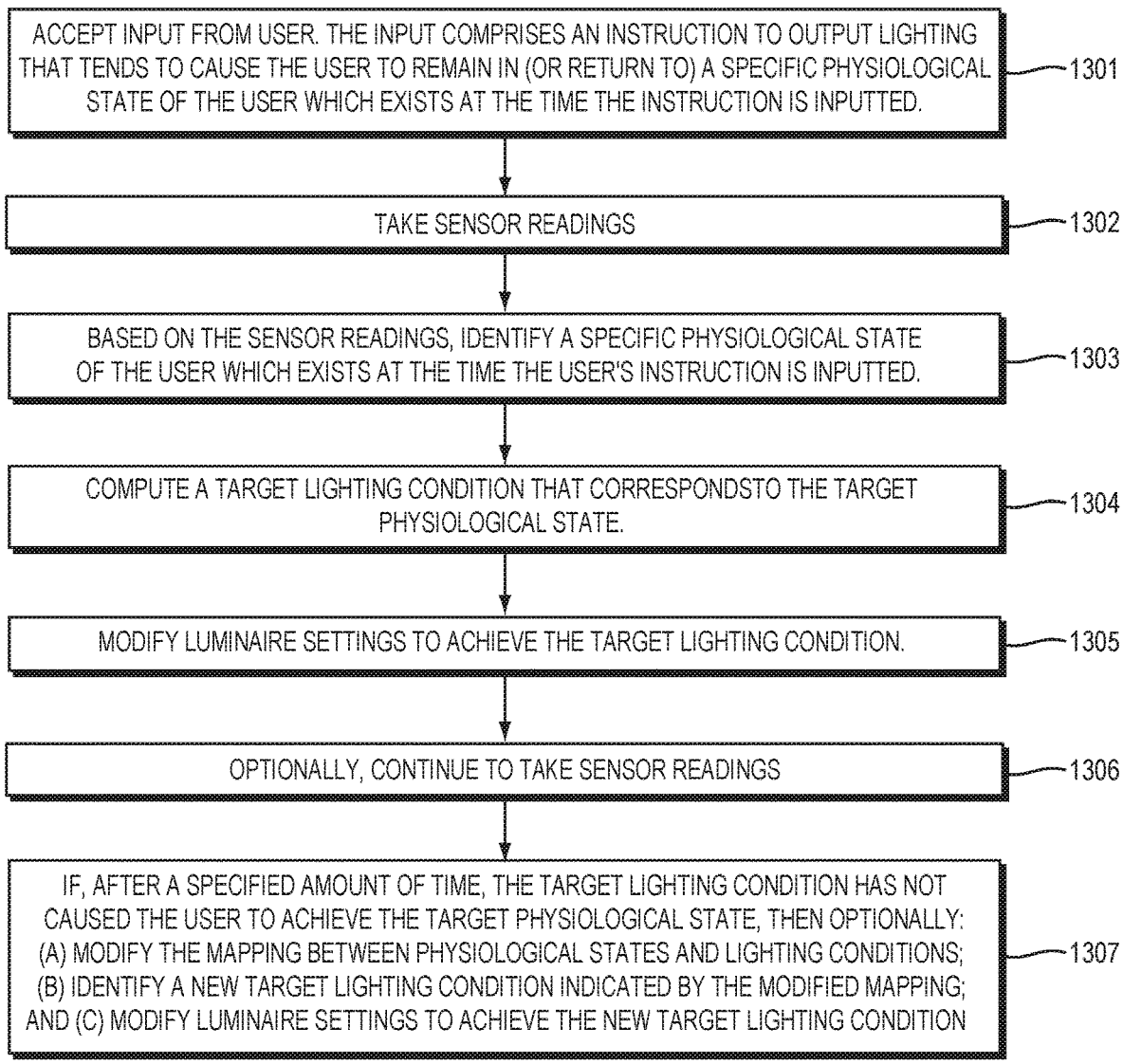
FIG. 13 shows a method of lighting control, in which a user inputs an instruction for a lighting system to output lighting that tends to cause the user to remain in a current physiological state.

FIG. 13 shows a method of lighting control, in which a user inputs an instruction for a lighting system to output lighting that tends to cause the user to remain in a current physiological state. In the example shown in FIG. 13, the method includes at least the following steps: Accept input from user, where the input comprises an instruction to output lighting that tends to cause the user to remain in (or return to) a specific physiological state of the user which exists at the time the instruction is inputted (Step 1301). Take sensor readings (Step 1302). Based on the sensor readings, identify a specific physiological state of the user which exists at the time the user's instruction is inputted (Step 1303). Compute a target lighting scene that corresponds to the target physiological state (Step 1304). Modify luminaire settings to achieve the target lighting scene (Step 1305). Optionally, continue to take sensor readings (Step 1306). If, after a specified amount of time, the target lighting scene has not caused the user to achieve the target physiological state, then optionally: (a) modify the mapping between physiological states and lighting scenes; (b) identify a new target lighting scene indicated by the modified mapping; and (c) modify luminaire settings to achieve the new target lighting scene (Step 1307).

Lighting Design

In some cases: (a) image analysis produces a transformed, image-based map; and (b) this image analysis may be employed during the planning phase of a lighting installation. For instance, the image analysis may be integrated as a feature of a 3D rendering or lighting simulation software. To execute the analysis, a practitioner may define several views of interest. The software may then visualize the perceptual map for each view angle and provide an overview of the expected lighting outcome. Using the image analysis, a perceptual analysis for the model may be completed within seconds. Based on the analysis, the practitioner may decide to change the room setup, for example, the type of luminaire, luminaire light output, and wall color, and observe how these changes contribute to the visual experience. The practitioner may also compare the computed perceptual map with a target template to identify where changes are needed to achieve a desired result.

The image analysis may be used to optimize the layout and lighting scenes in a way that produces the largest perceptual difference between scenes to ensure a rich and interesting experience.

In some cases, during the planning phase of a lighting installation, an iterative process may be employed to optimize for highest perceptual impact. In this iterative process, each iteration may include: (a) modeling the space and lighting setup; and (b) image-based mapping. After optimizing the design, the lighting may be installed.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, a camera; (2) to control the operation of, or interface with, luminaires; (3) to receive data from, control, or interface with one or more sensors; (4) to encode a digital image in RGBE image format; (5) to create an HDR image from a set of images captured at different camera stops; (6) to perform dimensionality reduction; (7) to register an image-based map with a rating-based map; (8) to transform an image-based map; (9) to perform any other calculation, computation, program, algorithm, or computer function described or implied herein; (10) to receive signals indicative of human input; (11) to output signals for controlling transducers for outputting information in human perceivable format; (12) to process data, to perform computations, and to execute any algorithm or software; and (13) to control the read or write of data to and from memory devices (tasks 1-13 of this sentence referred to herein as the "Computer Tasks"). The one or more computers (e.g., 103, 303) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 102, 103, 105, 303, 304, 333, 334) are configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 103, 303) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTE (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" means a computational device that is configured to perform logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer in such a way that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

"Dynamic range" of an image means the ratio of the luminance of the darkest reproducible shadow captured in the image to the luminance of the brightest reproducible highlight captured in the image.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any radiometric or photometric measure of intensity, energy or power. Each of the following is an example of "intensity" of light: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure, radiant energy density, luminance, luminous intensity, luminous energy, luminous flux, luminous power, illuminance, luminous exitance, luminous emittance, luminous exposure, and luminous energy density.

"Lighting scene" means an illumination pattern.

The term "or" is inclusive, not exclusive. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Rating" or "user rating" means data that encodes an evaluation by a human of a lighting scene.

"Relevant dimension" is defined above.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) capturing a set of images of a first room in such a way that each image in the set captures the first room under a lighting scene that is different than that for each other image in the set; (b) performing dimensionality reduction that involves (i) taking, as an input, the set of images and (ii) outputting a representation of the images; (c) performing registration that involves (i) registering the representation of the images with a representation of user ratings, and (ii) outputting a registered representation of the images; and (d) controlling luminaires in the first room in such a way that (i) in at least some steps of the controlling, coordinates of one or more lighting scenes are expressed in a coordinate system, and (ii) axes of the coordinate system are identical to axes of the registered representation of the images, wherein the user ratings are ratings of lighting scenes in one or more other rooms. In some cases, the method: (a) does not include gathering user ratings of lighting scenes in the first room; and (b) does not include taking, as input to any computation, any data that comprises or is derived from user ratings of lighting scenes in the first room. In some cases, each of the images has a dynamic range that is greater than or equal to 8,000:1. In some cases, the registration comprises Procrustes analysis. In some cases, the dimensionality reduction comprises Principal Component Analysis. In some cases: (a) the dimensionality reduction comprises Principal Component Analysis (PCA); (b) the PCA outputs at least a first principal component and a second principal component; and (c) the first and second principal components are, before the registration, axes of the representation of the images. In some cases: (a) the first and second principal components are transformed by the registration, resulting in transformed first and second principal components; and (b) the transformed first and second principal components are axes of the registered representation of the images and are also axes of the coordinate system. In some cases, the dimensionality reduction comprises t-distributed stochastic neighbor embedding. In some cases: (a) in the registered representation of the images, a specific image is represented by a datapoint; (b) the datapoint is also associated with a specific lighting scene captured in the specific image; (c) the datapoint has specific coordinates in the registered representation of the images; and (d) in at least one step in the controlling, the specific lighting scene is associated with the specific coordinates. Each of the cases described above in this paragraph is an example of the method described in the first sentence of this paragraph, and is also an example of an embodiment of this invention that may be combined with other embodiments of this invention.

In some implementations, this invention is a method comprising: (a) capturing a set of images of a room in such a way that each image in the set captures the room under a lighting scene that is different than that for each other image in the set; (b) performing dimensionality reduction that involves (i) taking, as an input, the set of images and (ii) outputting a representation of the images; (c) performing registration that involves (i) registering the representation of the images with a representation of user ratings, and (ii) outputting a registered representation of the images; and (d) controlling luminaires in the room in such a way that (i) in at least some steps of the controlling, coordinates of one or more lighting scenes are expressed in a coordinate system, and (ii) axes of the coordinate system are identical to axes of the registered representation of the images, wherein the user ratings are ratings of a subset of the lighting scenes captured in the set of images. In some cases, the subset of lighting scenes consists of only three lighting scenes. In some cases: (a) the lighting scenes captured in the set of images consist of six or more lighting scenes; and (a) the subset of lighting scenes consists of only three lighting scenes. In some cases, the method does not include taking, as input to any computation, any data that comprises or is derived from user ratings of lighting scenes in any other room. In some cases, each of the images has a dynamic range that is greater than or equal to 8,000:1. In some cases, the registration comprises Procrustes analysis. In some cases: (a) the dimensionality reduction comprises Principal Component Analysis (PCA); (b) the PCA outputs at least a first principal component and a second principal component; (c) the first and second principal components are, before the registration, axes of the representation of the images; (d) the first and second principal components are transformed by the registration, resulting in transformed first and second principal components; and (e) the transformed first and second principal components are axes of the registered representation of the images and are also axes of the coordinate system. In some cases: (a) in the registered representation of the images, a specific image is represented by a datapoint; (b) the datapoint is also associated with a specific lighting scene captured in the specific image; (c) the datapoint has specific coordinates in the registered representation of the images; and (d) in at least one step in the controlling, the specific lighting scene is associated with the specific coordinates. In some cases, each image in the set of images includes data regarding color in each of multiple regions of the room, in such a way that the data regarding color is measured separately for each region. Each of the cases described above in this paragraph is an example of the method described in the first sentence of this paragraph, and is also an example of an embodiment of this invention that may be combined with other embodiments of this invention.

In some implementations, this invention is a system comprising: (a) a digital color camera; (b) a plurality of luminaires; and (c) one or more computers that are programmed (i) to cause the luminaires to illuminate a first room and to cause a camera to capture a set of images of the first room, in such a way that each image in the set captures the first room under a lighting scene that is different than that for each other image in the set, (ii) to perform dimensionality reduction that involves (A) taking, as an input, the set of images and (B) outputting a representation of the images, (iii) to perform registration that involves (A) registering the representation of the images with a representation of user ratings, and (B) outputting a registered representation of the images, and (iv) to control luminaires in the first room by a control algorithm in such a way that (A) in at least some steps of the control algorithm, coordinates of one or more lighting scenes are expressed in a coordinate system, and (B)

axes of the coordinate system are identical to axes of the registered representation of the images, wherein the user ratings are ratings of lighting scenes in one or more other rooms. In some cases, the one or more computers are programmed to calculate the registered representation of the images without taking as an input any data that comprises or is derived from user ratings of lighting scenes in the first room. In some cases: (a) in the registered representation of the images, a specific image is represented by a datapoint; (b) the datapoint is also associated with a specific lighting scene captured in the specific image; (c) the datapoint has specific coordinates in the registered representation of the images; and (d) in at least one step in the control algorithm, the specific lighting scene is associated with the specific coordinates. Each of the cases described above in this paragraph is an example of the system described in the first sentence of this paragraph, and is also an example of an embodiment of this invention that may be combined with other embodiments of this invention.

Each description herein (or in the Provisionals) of any method, apparatus or system of this invention describes a non-limiting example of this invention. This invention is not limited to those examples, and may be implemented in other ways.

Each description herein (or in the Provisionals) of any prototype of this invention describes a non-limiting example of this invention. This invention is not limited to those examples, and may be implemented in other ways.

Each description herein (or in the Provisionals) of any implementation, embodiment or case of this invention (or any use scenario for this invention) describes a non-limiting example of this invention. This invention is not limited to those examples, and may be implemented in other ways.

Each Figure herein (or in the Provisionals) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
   (a) creating a set of images of a first room in such a way that each image in the set is a rendering that shows a simulation of the first room under a lighting scene that is different than that for each other image in the set;
   (b) performing dimensionality reduction that involves (i) taking, as an input, the set of images and (ii) outputting a representation of the images;
   (c) performing registration that involves (i) registering the representation of the images with a representation of user ratings, and (ii) outputting a registered representation of the images; and
   (d) controlling luminaires in the first room in such a way that (i) in at least some steps of the controlling, coordinates of one or more lighting scenes are expressed in a coordinate system, and (ii) axes of the coordinate system are identical to axes of the registered representation of the images, wherein the user ratings are ratings of lighting scenes in one or more other rooms.

2. The method of claim 1, wherein the method:
   (a) does not include gathering user ratings of lighting scenes in the first room; and
   (b) does not include taking, as input to any computation, any data that comprises or is derived from user ratings of lighting scenes in the first room.

3. The method of claim 1, wherein each of the images has a dynamic range that is greater than or equal to 8,000:1.

4. The method of claim 1, wherein the registration comprises Procrustes analysis.

5. The method of claim 1, wherein the dimensionality reduction comprises Principal Component Analysis.

6. The method of claim 1, wherein:
   (a) the dimensionality reduction comprises Principal Component Analysis (PCA);
   (b) the PCA outputs at least a first principal component and a second principal component; and
   (c) the first and second principal components are, before the registration, axes of the representation of the images.

7. The method of claim 6 wherein:
   (a) the first and second principal components are transformed by the registration, resulting in transformed first and second principal components; and
   (b) the transformed first and second principal components are axes of the registered representation of the images and are also axes of the coordinate system.

8. The method of claim 1, wherein the dimensionality reduction comprises t-distributed stochastic neighbor embedding.

9. The method of claim 1, wherein:
   (a) in the registered representation of the images, a specific image is represented by a datapoint;
   (b) the datapoint is also associated with a specific lighting scene captured in the specific image; and
   (c) the datapoint has specific coordinates in the registered representation of the images.

10. A method comprising:
    (a) creating a set of images of a room in such a way that each image in the set is a rendering that shows a simulation of the room under a lighting scene that is different than that for each other image in the set;
    (b) performing dimensionality reduction that involves (i) taking, as an input, the set of images and (ii) outputting a representation of the images;
    (c) performing registration that involves (i) registering the representation of the images with a representation of user ratings, and (ii) outputting a registered representation of the images; and
    (d) controlling luminaires in the room in such a way that (i) in at least some steps of the controlling, coordinates of one or more lighting scenes are expressed in a coordinate system, and (ii) axes of the coordinate system are identical to axes of the registered representation of the images, wherein the user ratings are ratings of a subset of the lighting scenes in the set of images.

11. The method of claim 10, wherein the subset of lighting scenes consists of only three lighting scenes.

12. The method of claim 10, wherein:
(a) the lighting scenes shown in the set of images consist of six or more lighting scenes; and
(a) the subset of lighting scenes consists of only three lighting scenes.

13. The method of claim 10, wherein each of the images has a dynamic range that is greater than or equal to 8,000:1.

14. The method of claim 10, wherein the registration comprises Procrustes analysis.

15. The method of claim 10 wherein:
(a) the dimensionality reduction comprises Principal Component Analysis (PCA);
(b) the PCA outputs at least a first principal component and a second principal component;
(c) the first and second principal components are, before the registration, axes of the representation of the images;
(d) the first and second principal components are transformed by the registration, resulting in transformed first and second principal components; and
(e) the transformed first and second principal components are axes of the registered representation of the images and are also axes of the coordinate system.

16. The method of claim 10, wherein:
(a) in the registered representation of the images, a specific image is represented by a datapoint;
(b) the datapoint is also associated with a specific lighting scene captured in the specific image; and
(c) the datapoint has specific coordinates in the registered representation of the images.

17. The method of claim 10, wherein each image in the set of images includes data regarding color in each of multiple regions of the room, in such a way that the data regarding color is measured separately for each region.

18. A system comprising:
(a) a plurality of luminaires that are located in a room; and
(b) one or more computers that are programmed
(i) to create a set of images in such a way that each image in the set is a rendering that shows a simulation of the room under a lighting scene that is different than that for each other image in the set,
(ii) to perform dimensionality reduction that involves (A) taking, as an input, the set of images and (B) outputting a representation of the images,
(iii) to perform registration that involves (A) registering the representation of the images with a representation of user ratings, and (B) outputting a registered representation of the images, and
(iv) to control the luminaires in the first room by a control algorithm in such a way that (A) in at least some steps of the control algorithm, coordinates of one or more lighting scenes are expressed in a coordinate system, and (B) axes of the coordinate system are identical to axes of the registered representation of the images,
wherein the user ratings are ratings of a subset of the lighting scenes in the set of images.

19. The system of claim 18, wherein the subset of lighting scenes consists of only three lighting scenes.

20. The system of claim 18, wherein:
(a) in the registered representation of the images, a specific image is represented by a datapoint;
(b) the datapoint is also associated with a specific lighting scene captured in the specific image; and
(c) the datapoint has specific coordinates in the registered representation of the images.

* * * * *